(12) United States Patent
Kitazume et al.

(10) Patent No.: US 11,753,069 B2
(45) Date of Patent: Sep. 12, 2023

(54) CONTROL DEVICE AND ELECTRIC POWER STEERING DEVICE

(71) Applicant: NSK LTD., Tokyo (JP)

(72) Inventors: Tetsuya Kitazume, Maebashi (JP); Shoya Maruyama, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/783,355

(22) PCT Filed: Oct. 4, 2021

(86) PCT No.: PCT/JP2021/036644
§ 371 (c)(1),
(2) Date: Jun. 8, 2022

(87) PCT Pub. No.: WO2022/085405
PCT Pub. Date: Apr. 28, 2022

(65) Prior Publication Data
US 2023/0016560 A1 Jan. 19, 2023

(30) Foreign Application Priority Data
Oct. 21, 2020 (JP) .................................. 2020-176775

(51) Int. Cl.
*B62D 5/04* (2006.01)
(52) U.S. Cl.
CPC ......... *B62D 5/0472* (2013.01); *B62D 5/0469* (2013.01)
(58) Field of Classification Search
CPC combination set(s) only.
See application file for complete search history.

(56) References Cited

U.S. PATENT DOCUMENTS 9,796,411 B2 * 10/2017 Ieyasu .................... B62D 6/008
2002/0017421 A1    2/2002 Stevens et al.
(Continued)

FOREIGN PATENT DOCUMENTS

CN    110696909 A        1/2020
EP      1900605 A2 *    3/2008 ........... B62D 5/0463
(Continued)

OTHER PUBLICATIONS

International Search Report of PCT/JP2021/036644 dated Dec. 21, 2021 [PCT/ISA/210].
(Continued)

*Primary Examiner* — Redhwan K Mawari
(74) *Attorney, Agent, or Firm* — Sughrue Mion, PLLC

(57) ABSTRACT

A control device includes a current command value calculation unit configured to calculate a first current command value causing an actuator to generate steering assist torque, a correction value calculation unit configured to, when an absolute value of steering angle is greater than or equal to a threshold value, calculate a correction value for suppressing increase in an absolute value of the steering angle by correcting the steering assist torque, a correction unit configured to calculate a second current command value obtained by correcting the first current command value by the correction value, and a driving unit configured to drive the actuator, based on the second current command value. The correction value calculation unit calculates the correction value, based on first torque, the first torque changing nonlinearly with respect to steering angular velocity.

15 Claims, 12 Drawing Sheets

(56) References Cited

U.S. PATENT DOCUMENTS

| | | | | |
|---|---|---|---|---|
| 2017/0066475 | A1* | 3/2017 | Kudo | B62D 15/025 |
| 2018/0079447 | A1 | 3/2018 | Yamashita et al. | |
| 2018/0350242 | A1* | 12/2018 | Fujii | B60W 30/18163 |
| 2019/0351936 | A1* | 11/2019 | Anraku | B62D 6/08 |
| 2020/0010112 | A1* | 1/2020 | Toko | B62D 5/0409 |

FOREIGN PATENT DOCUMENTS

| | | | | | |
|---|---|---|---|---|---|
| EP | 3569475 | B1 | * | 12/2020 | B62D 5/0412 |
| JP | 2008-49914 | A | * | 3/2008 | B62D 6/00 |
| JP | 2013-237397 | A | | 11/2013 | |
| JP | 2014-133533 | A | | 7/2014 | |
| JP | 2014133533 | A | * | 7/2014 | |
| JP | 6313703 | B2 | | 4/2018 | |
| JP | 2019-199172 | A | | 11/2019 | |
| JP | 2020-006831 | A | | 1/2020 | |
| WO | WO-2018051838 | A1 | * | 3/2018 | B62D 15/021 |
| WO | 2019/193976 | A1 | | 10/2019 | |

OTHER PUBLICATIONS

Written Opinion of PCT/JP2021/036644 dated Dec. 21, 2021 [PCT/ISA/237].

Supplementary European Search Report dated Dec. 15, 2022 in European Application No. 21882546.1.

Office Action dated Jan. 31, 2023 in European Application No. 21882546.1.

International Preliminary Report on Patentability dated Apr. 13, 2023 with a Translation of the Written Opinion of the International Searching Authority in Application No. PCT/JP2021/036644.

Office Action dated Jul. 26, 2023 in Chinese Application No. 202180006722.6.

* cited by examiner

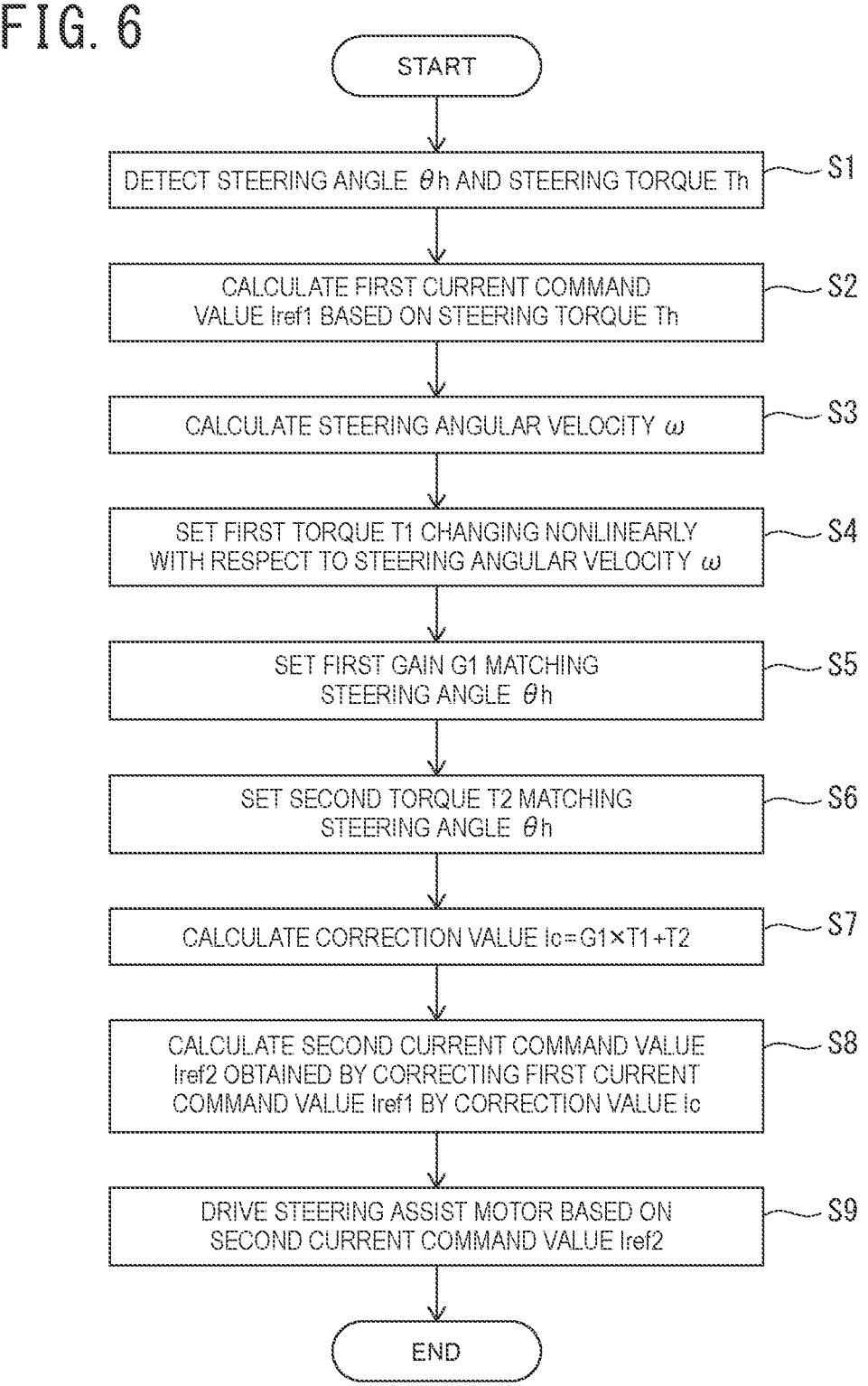

CONTROL DEVICE AND ELECTRIC POWER STEERING DEVICE

CROSS REFERENCE TO RELATED APPLICATIONS

This application is a National Stage of International Application No. PCT/JP2021/036644, filed Oct. 4, 2021, claiming priority to Japanese Patent Application No. 2020-176775, filed Oct. 21, 2020.

TECHNICAL FIELD

The present invention relates to a control device and an electric power steering device.

BACKGROUND ART

In a turning mechanism of a vehicle, when a turning angle of steered wheels increases and reaches a maximum mechanical turning angle, the rack shaft of the turning mechanism reaches a stroke end and it becomes impossible to increase the turning angle any further. The rack shaft being brought to a state of having reached a stroke end as described above is referred to as "end-abutting". The maximum mechanical turning angle and a maximum steering angle of the steering wheel corresponding thereto are referred to as "rack end". When end-abutting occurs at a high steering angular velocity, there is a possibility that large impact and hit sound (abnormal noise) are generated and the driver feels uncomfortable.

In PTL 1, an electric power steering device that calculates spring reaction force, which increases in association with increase in the steering angle, and damping force, which increases in association with increase in the steering angular velocity, and, by generating steering reaction force by the spring reaction force and the damping force, suppresses impact at the time of end-abutting is described. The electric power steering device, by multiplying the steering angular velocity by damping force gain, calculates the damping force.

CITATION LIST

Patent Literature

PTL1: JP 6313703 B

SUMMARY OF INVENTION

Technical Problem

When damping force is calculated by multiplying the steering angular velocity by gain, the damping force fluctuates according to the steering angular velocity. There is a possibility that fluctuation in steering reaction force associated with the fluctuation in the damping force causes vibration to occur in a steering system.

That is, as the steering reaction force increases, the steering angular velocity is reduced. As the steering angular velocity is reduced, the damping force decreases, and the steering angular velocity increases and the steering reaction force increases again. The interaction described above causes the steering angular velocity to repeat increase and decrease and repetition of increase and decrease in the steering reaction force associated therewith causes vibration to occur. There is a possibility that vibration in a steering system becoming large causes deterioration in steering feeling.

The present invention has been made in consideration of the above-described problem, and an object of the present invention is to reduce vibration occurring in a steering system when impact at the time of end-abutting is to be suppressed by torque depending on steering angular velocity.

Solution to Problem

In order to achieve the above-described object, according to an aspect of the present invention, there is provided a control device including: a current command value calculation unit configured to calculate a first current command value, the first current command value causing an actuator to generate steering assist torque, based on at least steering torque; a correction value calculation unit configured to, when an absolute value of steering angle is greater than or equal to a threshold value, calculate a correction value for suppressing increase in an absolute value of the steering angle by correcting the steering assist torque; a correction unit configured to calculate a second current command value obtained by correcting the first current command value by the correction value; and a driving unit configured to drive the actuator, based on the second current command value, wherein the correction value calculation unit calculates the correction value, based on first torque, the first torque changing nonlinearly with respect to steering angular velocity.

According to another aspect of the present invention, there is provided an electric power steering device including: the control device described above; and an actuator controlled by the control device, wherein the electric power steering device applies steering assist torque to a steering system of a vehicle through the actuator.

Advantageous Effects of Invention

According to the present invention, it is possible to reduce vibration occurring in a steering system when impact at the time of end-abutting is to be suppressed by torque depending on steering angular velocity.

BRIEF DESCRIPTION OF DRAWINGS

FIG. 6 is a flowchart of an example of a method for controlling a steering assist motor of the embodiments;

DESCRIPTION OF EMBODIMENTS

Embodiments of the present invention will be described in detail with reference to the drawings. Note that the embodiments of the present invention to be described below indicate devices and methods to embody the technical idea of the present invention by way of example, and the technical idea of the present invention does not limit the constitution, arrangements, and the like of the constituent components to those described below. The technical idea of the present invention can be subjected to a variety of alterations within the technical scope prescribed by the claims described in CLAIMS.

First Embodiment (Configuration)

Figure 1:
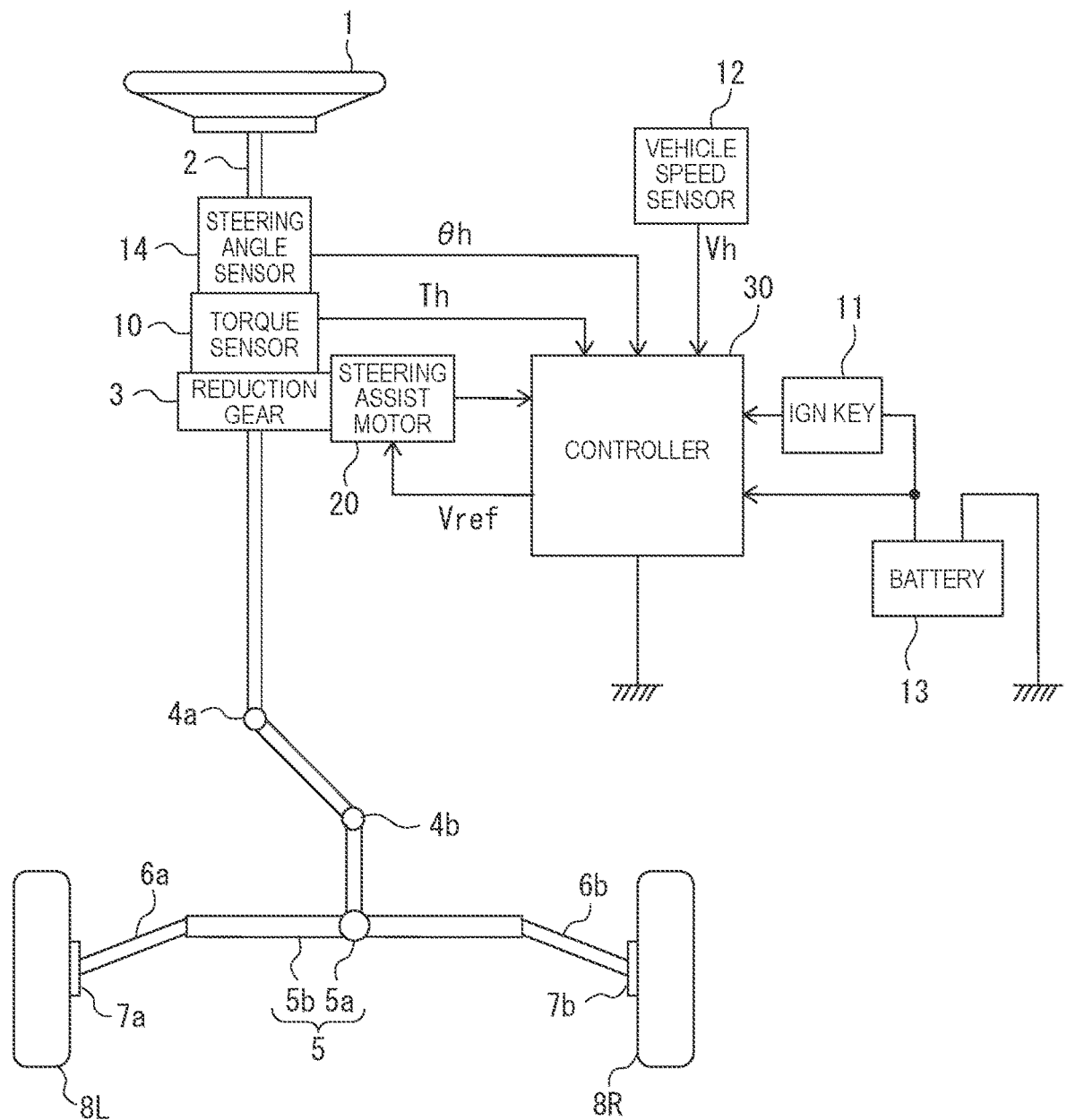
FIG. 1 is a configuration diagram illustrative of an outline of an example of an electric power steering device of embodiments.

FIG. 1 is a configuration diagram illustrative of an outline of an example of an electric power steering device of embodiments. A steering shaft (steering wheel shaft) 2 of a steering wheel 1 is connected to steered wheels 8L and 8R via a reduction gear (worm gear) 3, which constitutes a speed reduction mechanism, universal joints 4a and 4b, a pinion rack mechanism 5, and tie rods 6a and 6b and further via hub units 7a and 7b.

The pinion rack mechanism 5 includes a pinion 5a that is coupled to a pinion shaft, to which steering force is transmitted from the universal joint 4b, and a rack 5b that meshes with the pinion 5a, and converts rotational motion transmitted to the pinion 5a to linear motion in the vehicle width direction by means of the rack 5b.

To the steering shaft 2, a torque sensor 10 configured to detect steering torque Th is disposed. To the steering shaft 2, a steering angle sensor 14 configured to detect a steering angle θh of the steering wheel 1 is also disposed.

A steering assist motor 20 configured to assist steering force of the steering wheel 1 is also coupled to the steering shaft 2 via the reduction gear 3. To a controller 30 configured to control the electric power steering (EPS) device, power is supplied from a battery 13 and an ignition key signal is also input via an ignition (IGN) key 11.

Note that a means for providing steering assist force is not limited to a motor and a variety of types of actuators can be used.

The controller 30 performs calculation of a current command value of an assist control command, based on steering torque Th detected by the torque sensor 10, vehicle speed Vh detected by a vehicle speed sensor 12, and a steering angle θh detected by the steering angle sensor 14 and controls current to be supplied to the steering assist motor 20 by a voltage control command value Vref obtained by performing compensation and the like on the calculated current command value.

Note that the steering angle sensor 14 is not an essential component and the steering angle θh may be calculated by adding a torsion angle of a torsion bar in the torque sensor 10 to a rotation angle obtained from a rotation angle sensor configured to detect a rotation angle of the rotation shaft of the steering assist motor 20.

In addition, a turning angle of the steered wheels 8L and 8R may be used in place of the steering angle θh. The turning angle may be detected by, for example, detecting a displacement amount of the rack 5b.

The controller 30 may include, for example, a computer including a processor and peripheral components, such as a storage device. The processor may be, for example, a central processing unit (CPU) or a micro-processing unit (MPU).

The storage device may include anyone of a semiconductor storage device, a magnetic storage device, and an optical storage device. The storage device may include registers, a cache memory or a memory such as a read only memory (ROM) or a random access memory (RAM) that is used as a main storage device.

Functions of the controller 30, which will be described below, are achieved by, for example, the processor of the controller 30 executing computer programs stored in the storage device.

Note that the controller 30 may be formed by use of dedicated hardware for performing respective units of information processing, which will be described below.

For example, the controller 30 may include functional logic circuits that are set in a general-purpose semiconductor integrated circuit. For example, the controller 30 may have a programmable logic device (PLD), such as a field-programmable gate array (FPGA).

Figure 2:
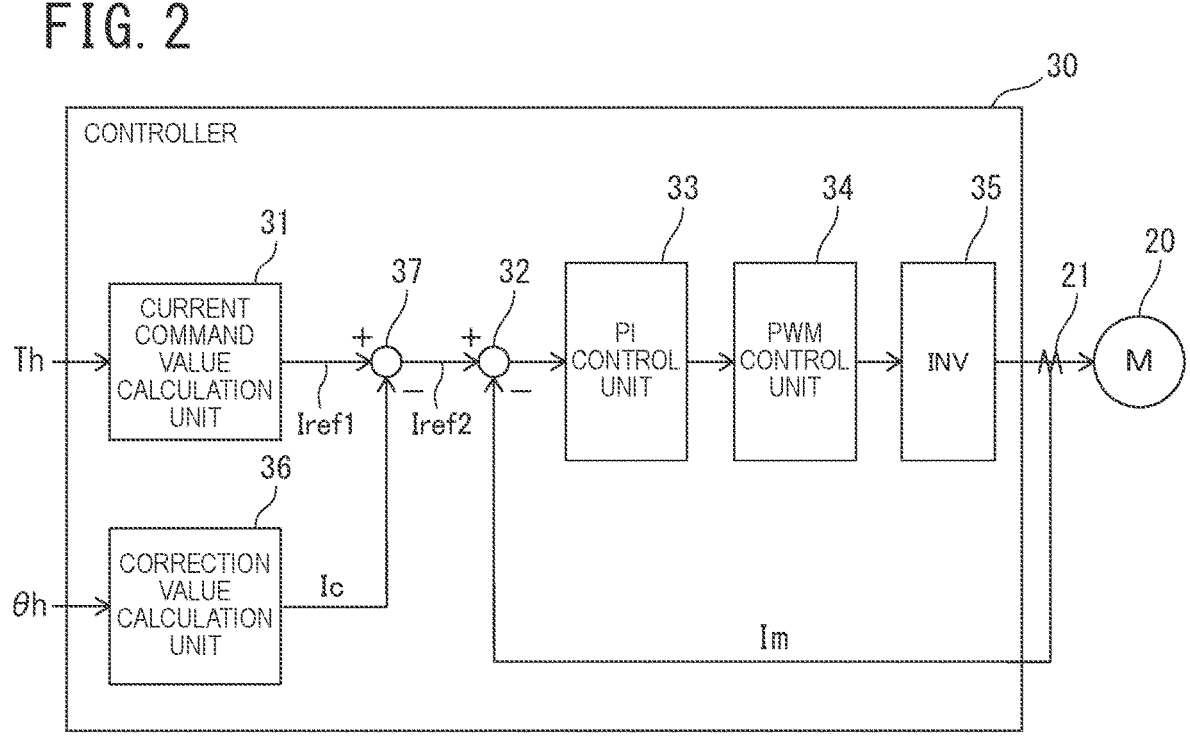
FIG. 2 is a block diagram illustrative of an example of a functional configuration of a controller illustrated in FIG. 1.

FIG. 2 is a block diagram illustrative of an example of a functional configuration of the controller 30 of the embodiments. The controller 30 includes a current command value calculation unit 31, subtracters 32 and 37, a proportional-integral (PI) control unit 33, a pulse width modulation (PWM) control unit 34, an inverter (INV) 35, and a correction value calculation unit 36.

The current command value calculation unit 31 calculates a first current command value Iref1, which is a control target value of driving current of the steering assist motor 20, based on at least the steering torque Th. The current command value calculation unit 31 may calculate the first current command value Iref1, based on the steering torque Th and the vehicle speed Vh.

The correction value calculation unit 36 calculates a correction value Ic for suppressing impact and hit sound (abnormal noise) at the time of end-abutting by correcting the first current command value Iref1 and thereby suppressing increase in an absolute value |θh| of the steering angle θh when the absolute value |θh| of the steering angle θh is greater than a threshold value θt.

Figure 3:
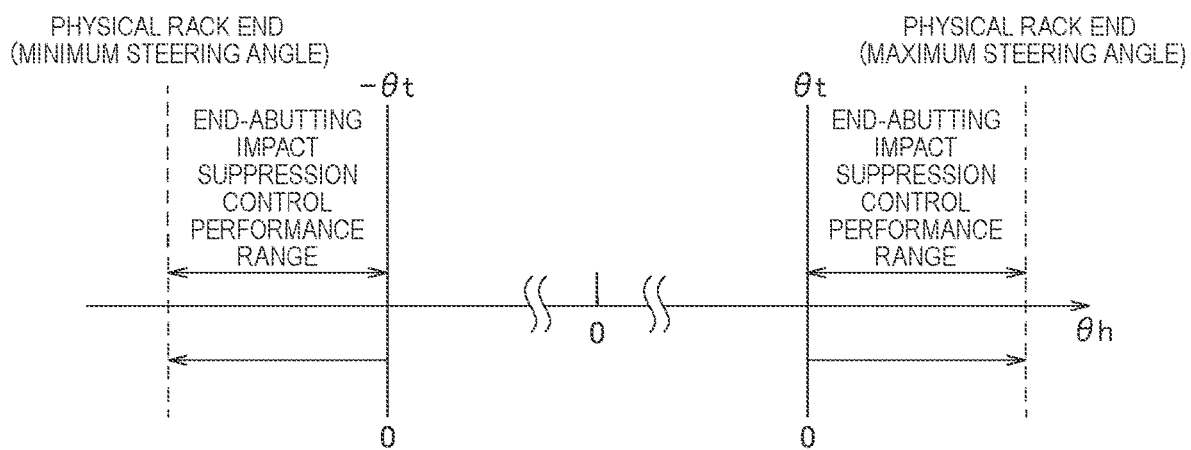
FIG. 3 is an explanatory diagram of an example of a steering angle range where end-abutting impact suppression control is performed.

FIG. 3 is now referred to. When the steering angle θh is greater than the threshold value θt or less than a threshold value (−θt), the correction value calculation unit 36 performs control to suppress increase in the absolute value |θh| of the steering angle (hereinafter, sometimes referred to as "end-abutting impact suppression control").

The threshold value θt is set to an angle that is smaller than a maximum steering angle, which serves as a physical rack end, by a predetermined margin, and the threshold value (−θt) is set to an angle that is larger than a minimum steering angle by the predetermined margin.

When the steering angle θh is less than or equal to the threshold value θt and greater than or equal to the threshold value (−θt), the correction value calculation unit 36 does not perform the end-abutting impact suppression control and sets a value of the correction value Ic to "0".

Details of the correction value calculation unit 36 will be described later.

FIG. 2 is now referred to. The subtracter 37 corrects the first current command value Iref1 by subtracting the correction value Ic from the first current command value Iref1 and outputs the first current command value Iref1 after correction as a second current command value Iref2. The subtracter 37 is an example of a "correction unit" described in the claims.

The second current command value Iref2 that the subtracter 37 calculated is input to the subtracter 32, deviation (Iref2-Im) of the second current command value Iref2 from a fed-back motor current value Im is calculated, and the deviation (Iref2-Im) is input to the PI control unit 33 for characteristic improvement of steering operation.

The voltage control command value Vref the characteristic of which is improved by the PI control unit 33 is input to the PWM control unit 34, and, further, the steering assist motor 20 is PWM-driven via the inverter 35, which serves as a driving unit. The current value Im input to the steering assist motor 20 is detected by a motor current detector 21 and fed back to the subtracter 32.

In the inverter 35, field effect transistors (FETs) are used as driving elements, and the inverter 35 is configured by a bridge circuit of the FETs.

The subtracter 32, the PI control unit 33, the PWM control unit 34, and the inverter 35 are an example of a "driving unit" described in the claims.

Next, details of the correction value calculation unit 36 will be described. The correction value calculation unit 36 suppresses increase in the absolute value |θh| of the steering angle by steering reaction torque at the time of the end-abutting impact suppression control.

When, for this purpose, for example, steering reaction torque that is proportional to steering angular velocity co of the steering wheel 1 (for example, viscous reaction torque) is used, there is a possibility that vibration occurs in a steering system.

That is, between such steering reaction torque and the steering angular velocity ω, there is an interaction in which, as the steering reaction torque becomes large, the steering angular velocity ω decreases, as the steering angular velocity ω decreases, the steering reaction torque becomes small, and, as the steering reaction torque becomes small, the steering angular velocity ω increases and the steering reaction torque increases again. This interaction causes the steering angular velocity ω to repeat increase and decrease, and repetition of increase and decrease in the steering reaction torque associated with the repetition of increase and decrease in the steering angular velocity ω causes vibration to occur.

Thus, the correction value calculation unit 36 of the embodiments suppresses increase in the absolute value |θh| of the steering angle by, in place of the torque proportional to the steering angular velocity ω, steering reaction torque that nonlinearly increases with respect to increase in the steering angular velocity ω.

Since such steering reaction torque nonlinearly changes with respect to the steering angular velocity ω, it is possible to reduce a rate of change (slope of change) of the steering reaction torque with respect to the steering angular velocity ω in an arbitrary velocity range of the steering angular velocity ω.

Since reducing the rate of change (slope of change) of the steering reaction torque with respect to the steering angular velocity ω causes the steering reaction torque to be less likely to increase or decrease even when the steering angular velocity ω increases or decreases, the interaction between the steering angular velocity ω and the steering reaction torque becomes small. As a result, the above-described vibration occurring due to repetition of increase and decrease in the steering angular velocity ω and the steering reaction torque is reduced.

Thus, reducing the rate of change of the steering reaction torque with respect to the steering angular velocity ω in a velocity range of the steering angular velocity ω where the amplitude of the above-described vibration becomes a problem enables the above-described vibration in the velocity range to be reduced.

Hereinafter, the above-described vibration occurring to the steering system due to repetition of increase and decrease in the steering reaction torque is simply referred to as "vibration to be suppressed".

Figure 4:
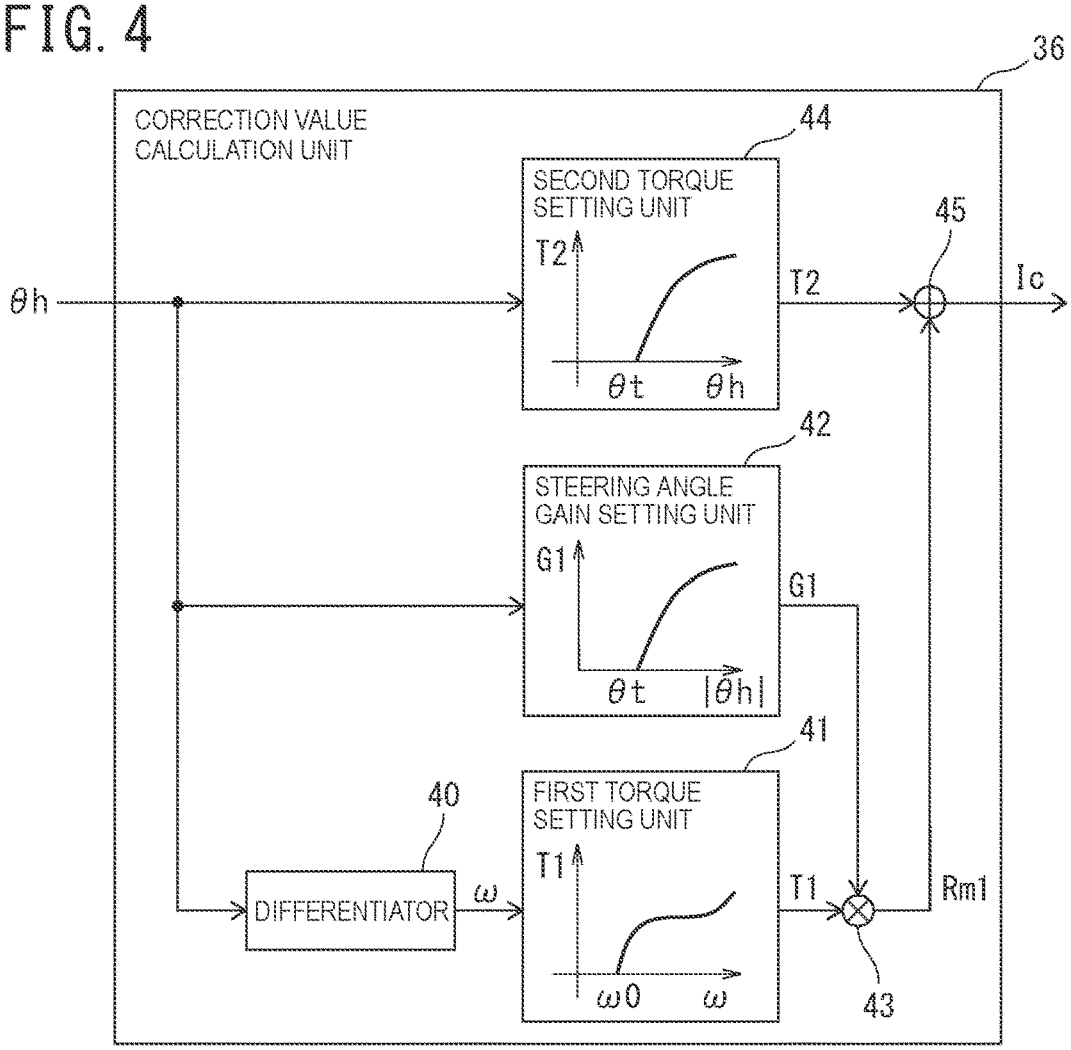
FIG. 4 is a block diagram illustrative of an example of a functional configuration of a correction value calculation unit of a first embodiment.

FIG. 4 is a block diagram illustrative of an example of a functional configuration of the correction value calculation unit 36 of the first embodiment. The correction value calculation unit 36 includes a differentiator 40, a first torque setting unit 41, a steering angle gain setting unit 42, a multiplier 43, a second torque setting unit 44, and an adder 45.

The differentiator 40 differentiates the steering angle θh and thereby calculates the steering angular velocity ω.

The first torque setting unit 41 sets the steering reaction torque, which nonlinearly increases with respect to increase in the steering angular velocity ω, as first torque T1, based on the steering angular velocity ω.

Figure 5:
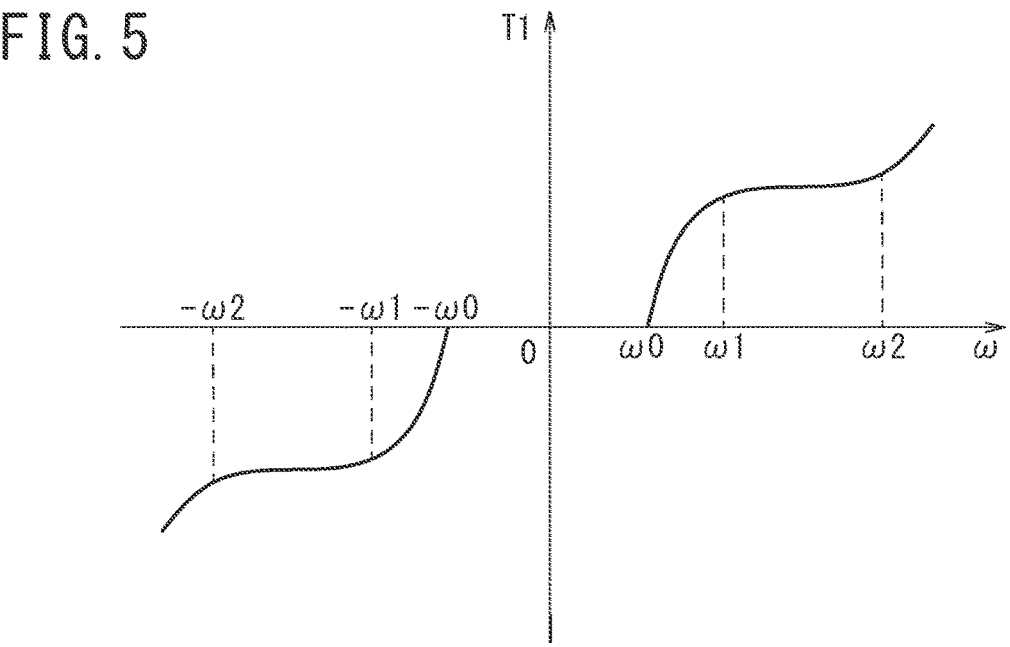
FIG. 5 is an explanatory diagram of an example of a characteristic of first torque.

FIG. 5 is an explanatory diagram of an example of a characteristic of the first torque T1 with respect to the steering angular velocity ω. Note that, regarding the positive and negative of the steering angle θh and the steering angular velocity ω thereof, the sign of the steering angle θh that advances from the neutral position of the steering mechanism in the clockwise direction is defined to be "positive" and the sign of the steering angle θh that advances from the neutral position in the counterclockwise direction is defined to be "negative".

In a velocity range from (−ω0) to ω0, there is no problem caused by impact at the time of end-abutting (for example, abnormal noise is low or there is no damage to the turning mechanism) because the steering angular velocity ω is low. In such a velocity range from (−ω0) to ω0, the value of the first torque T1 is set to "0".

Because of this configuration, it is possible to suppress influence on steering feeling by not generating the steering reaction torque depending on the steering angular velocity ω in a velocity range where there is no problem caused by impact at the time of end-abutting.

In a velocity range greater than the angular velocity $\omega 0$ and a velocity range less than the angular velocity $(-\omega 0)$, first torque T1 that monotonically increases nonlinearly with respect to increase in the steering angular velocity $\omega$ is set.

In a velocity range from $\omega 0$ to $\omega 1$, the higher the steering angular velocity $\omega$ is, the larger positive first torque T1 is set. In a negative velocity range from $(-\omega 0)$ to $(-\omega 1)$, the higher the steering angular velocity $\omega$ is, the smaller negative first torque T1 is set. Since, because of this configuration, as the steering angular velocity $\omega$ becomes higher, first torque T1 having a larger absolute value is generated, it is possible to suppress occurrence of end-abutting at high steering angular velocities $\omega$.

In a velocity range from $\omega 1$ to $\omega 2$, in which the steering angular velocity $\omega$ is higher than in the velocity range from $\omega 0$ to $\omega 1$, and a velocity range from $(-\omega 1)$ to $(-\omega 2)$, in which the steering angular velocity $\omega$ is higher than in the velocity range from $(-\omega 0)$ to $(-\omega 1)$, the vibration to be suppressed becomes large and the magnitude thereof poses a problem.

Thus, in the velocity range from $\omega 1$ to $\omega 2$ and the velocity range from $(-\omega 1)$ to $(-\omega 2)$, the rate of change $(dT1/d\omega)$ of the first torque T1 with respect to the steering angular velocity $\omega$ is reduced compared with the other velocity ranges (that is, the velocity range from $\omega 0$ to $\omega 1$ and the velocity range from $(-\omega 0)$ to $(-\omega 1)$, and a velocity range higher than the angular velocity $\omega 2$ and a velocity range higher than the angular velocity $(-\omega 2)$).

Since this configuration causes the first torque T1 to be less likely to increase or decrease even when the steering angular velocity $\omega$ increases or decreases, the interaction between the first torque T1 and the steering angular velocity $\omega$ becomes small. As a result, it is possible to reduce the vibration to be suppressed in the velocity range from $\omega 1$ to $\omega 2$ and the velocity range from $(-\omega 1)$ to $(-\omega 2)$.

In the velocity range from $\omega 0$ to $\omega 1$ and the velocity range from $(-\omega 0)$ to $(-\omega 1)$, the steering system does not have enough power to increase vibration unless the first torque T1 is large. Thus, the rate of change of the first torque T1 in the velocity range from $\omega 0$ to $\omega 1$ and the velocity range from $(-\omega 0)$ to $(-\omega 1)$ may be set higher than the rate of change of the first torque T1 in the velocity range from $\omega 1$ to $\omega 2$ and the velocity range from $(-\omega 1)$ to $(-\omega 2)$.

In the calculation of the rate of change, a rate of change may be calculated by dividing a difference $\Delta T1$ between first torques at two steering angular velocities defining a velocity range by a difference $\Delta \omega$ between the two steering angular velocities defining the velocity range. A rate of change may also be calculated by dividing a velocity range into a plurality of sections and calculating an average value of rates of change $(\Delta T1/\Delta \omega)$ each of which is calculated for one of the plurality of sections.

In the velocity range higher than the angular velocity $\omega 2$ and the velocity range higher than the angular velocity $(-\omega 2)$, the steering wheel 1 reaches a physical rack end fast because the steering wheel 1 rotates in high speed and a period of time during which vibration to be suppressed occurs is thus negligible. When the angular velocity $\omega$ is high, it is preferable to make the steering reaction torque larger and thereby suppress impact at the time of end-abutting.

Therefore, in the velocity range higher than the angular velocity $\omega 2$, the higher the steering angular velocity $\omega$ is, the larger positive first torque T1 is set. In the velocity range higher than the angular velocity $\omega 2$, the rate of change of the first torque T1 may be set higher than the rate of change of the first torque T1 in the velocity range from $\omega 1$ to $\omega 2$ and the velocity range from $(-\omega 1)$ to $(-\omega 2)$.

In the velocity range higher than the angular velocity $(-\omega 2)$, the higher the steering angular velocity $\omega$ is, the smaller negative first torque T1 is set. Since, because of this configuration, as the steering angular velocity $\omega$ becomes higher, first torque T1 having larger absolute value is generated, it is possible to prevent end-abutting from occurring at high steering angular velocities $\omega$.

A relationship between the steering angular velocity $\omega$ and the first torque T1 can be set in the first torque setting unit 41 as, for example, map data or a calculation formula in advance.

Although an example in which the value of the first torque T1 is set to "0", that is, the first torque T1 has a dead zone, in the velocity range from $(-\omega 0)$ to $(-\omega 0)$ was described, it may be configured such that the first torque T1 does not have a dead zone. The characteristic of the first torque T1 in this setting is the same as a characteristic of the first torque T1 when the angular velocities $\omega 0$ and $(-\omega 0)$ are set to "0" in FIG. 5. Although an example in which the rate of change of the first torque T1 in the velocity range higher than the angular velocity $\omega 2$ and the velocity range higher than the angular velocity $(-\omega 2)$ is larger than the rate of change of the first torque T1 in the velocity range from $\omega 1$ to $\omega 2$ and the velocity range from $(-\omega 1)$ to $(-\omega 2)$ was described, it may be configured such that the rate of change of the first torque T1 in the velocity range higher than the angular velocity $\omega 2$ and the velocity range higher than the angular velocity $(-\omega 2)$ is kept at a rate of change that is set in the velocity range from $\omega 1$ to $\omega 2$ and the velocity range from $(-\omega 1)$ to $(-\omega 2)$.

FIG. 4 is now referred to. The steering angle gain setting unit 42 sets first gain G1 depending on the steering angle $\theta h$. The multiplier 43 calculates a first multiplication result $Rm1=G1\times T1$ of the first torque T1 and the first gain G1.

The second torque setting unit 44 sets steering reaction torque depending on the steering angle $\theta h$ as second torque T2. The adder 45 calculates an addition result $(Rm1+T2)$ of the first multiplication result Rm1 and the second torque T2. The correction value calculation unit 36 calculates, as a correction value Ic, a current command value corresponding to a torque value that is an addition result output from the adder 45.

As illustrated in FIG. 4, in a range where the absolute value $|\theta h|$ of the steering angle is less than or equal to the threshold value $\theta t$, a value of the first gain G1 is set to "0". In a range where the absolute value $|\theta h|$ is greater than the threshold value $\theta t$, the first gain G1 monotonically increases with respect to increase in the absolute value $|\theta h|$.

A relationship between the steering angle $\theta h$ and the first gain G1 can be set in the steering angle gain setting unit 42 as, for example, map data or a calculation formula in advance.

In a range where the steering angle $\theta h$ is greater than or equal to 0 and less than or equal to the threshold value $\theta t$, a value of the second torque T2 is set to "0". In a range where the steering angle $\theta h$ is greater than the threshold value $\theta t$, the second torque T2 monotonically increases with respect to increase in the steering angle $\theta h$.

In a range where the steering angle $\theta h$ has a negative value, the second torque T2 has a characteristic that is origin symmetric to a characteristic of the second torque T2 in a range where the steering angle $\theta h$ has a positive value. That is, in a range where the steering angle $\theta h$ is greater than or equal to the threshold value $(-\theta t)$ and less than 0, the value of the second torque T2 is set to "0". In a range where the steering angle θh is less than the threshold value (−θt), the second torque T2 monotonically decreases with respect to decrease in the steering angle θh.

A relationship between the steering angle θh and the second torque T2 can be set in the second torque setting unit 44 as, for example, map data or a calculation formula in advance.

It may be configured such that a threshold value θt2 that is larger than the threshold value θt is set and the value of the second torque T2 is set to "0" in a range where the steering angle θh is greater than or equal to a threshold value (−θt2) and less than or equal to the threshold value θt2, the second torque T2 monotonically increases with respect to increase in the steering angle θh in a range where the steering angle θh is greater than the threshold value θt2, and the second torque T2 monotonically decreases with respect to decrease in the steering angle θh in a range where the steering angle θh is less than the threshold value (−θt2).

Because of this configuration, the correction value Ic=G1×T1+T2 can be set to "0" in a range where the absolute value |θh| of the steering angle is less than or equal to the threshold value θt (that is, a range where the end-abutting impact suppression control is not performed). That is, a dead zone can be set.

As the absolute value |θh| of the steering angle increases, steering reaction torque (G1×T1) depending on the steering angular velocity ω and steering reaction torque (T2) depending on the steering angle θh can be increased.

(Operation)

FIG. 6 is a flowchart of an example of a method for controlling a steering assist motor of the embodiments.

In step S1, the steering angle sensor 14 detects the steering angle θh of the steering wheel 1. The torque sensor 10 detects the steering torque Th applied to the steering shaft 2.

In step S2, the current command value calculation unit 31 calculates the first current command value Iref1, which is a control target value of driving current of the steering assist motor 20, based on at least the steering torque Th.

In step S3, the differentiator 40 of the correction value calculation unit 36 differentiates the steering angle θh and thereby calculates the steering angular velocity ω.

In step S4, the first torque setting unit 41 sets the first torque T1, which nonlinearly increases with respect to increase in the steering angular velocity ω, based on the steering angular velocity ω.

In step S5, the steering angle gain setting unit 42 sets the first gain G1 depending on the steering angle θh.

In step S6, the second torque setting unit 44 sets the steering reaction torque depending on the steering angle θh as the second torque T2.

In step S7, the multiplier 43 and the adder 45 calculate the correction value Ic=G1×T1+T2.

In step S8, the subtracter 37 corrects the first current command value Iref1 by subtracting the correction value Ic from the first current command value Iref1 and outputs the first current command value Iref1 after correction as the second current command value Iref2.

In step S9, the subtracter 32, the PI control unit 33, the PWM control unit 34, and the inverter 35 drive the steering assist motor 20, based on the second current command value Iref2. Subsequently, the process terminates.

Variations of the first embodiment will be described below. The variations described below can also be applied to second to sixth embodiments, which will be described later.

(First Variation)

In the above description, the correction value calculation unit 36 set the value of the correction value Ic to "0" by setting the values of the first gain G1 and the second torque T2 to "0" in the range where the absolute value |θh| of the steering angle is less than or equal to the threshold value θt (that is, the range where the end-abutting impact suppression control is not performed).

A correction value calculation unit 36 in a first variation calculates control steering angle θr that is set to "0" in the range where the absolute value |θh| of the steering angle is less than or equal to the threshold value θt, increases as the steering angle θh increases in the range where the steering angle θh is greater than the threshold value θt, and decreases as the steering angle θh decreases in the range where the steering angle θh is less than the threshold value (−θt).

Figure 7A:
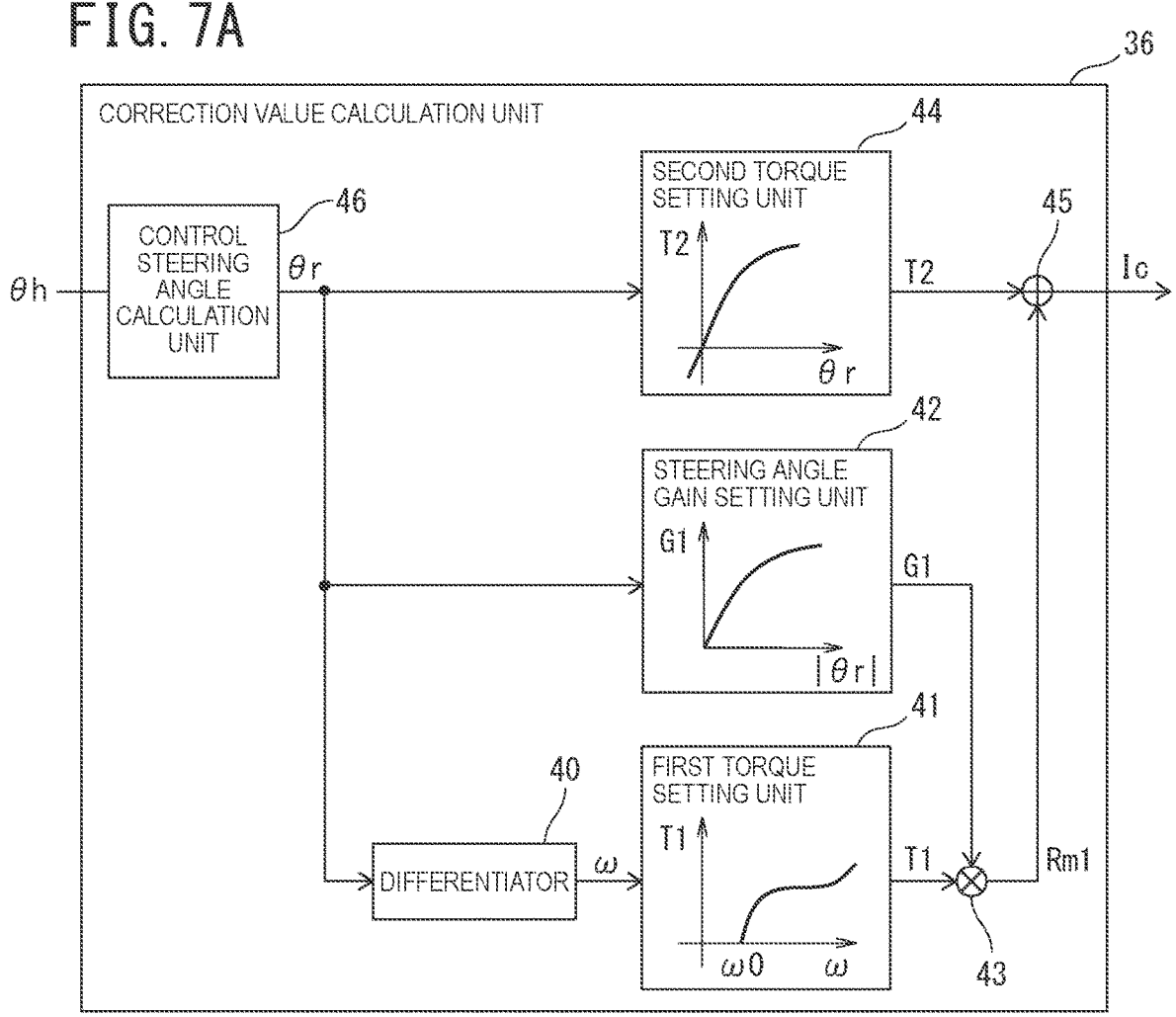
FIGS. 7A and 7B are a block diagram illustrative of an example of a functional configuration of a correction value calculation unit and an explanatory diagram of an example of a control steering angle, respectively, in a first variation of the first embodiment.
Figure 7B:
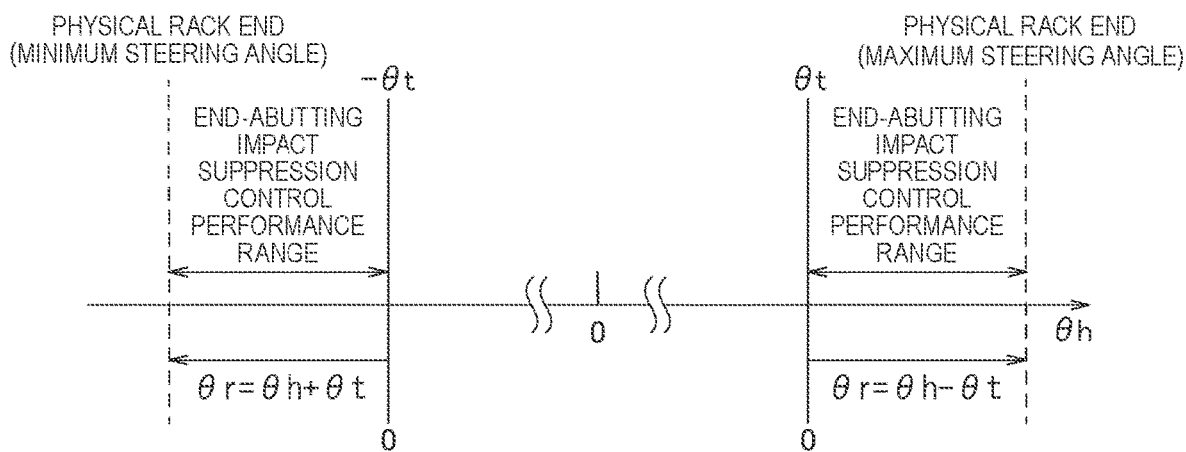

FIG. 7B is now referred to. The control steering angle θr may be calculated by, for example, the next formula:

when $|θh| ≤ θt$, $θr=0$;

when $θh > θt$, $θr = θh − θt$; and when $θh < (−θt)$, $θr = θh + θt$.

The correction value calculation unit 36 of the first variation calculates the correction value Ic, based on the control steering angle θr. Because of this configuration, the correction value Ic is set to "0" in the range where the absolute value |θh| of the steering angle is less than or equal to the threshold value θt (that is, the range where the end-abutting impact suppression control is not performed).

FIG. 7A is a block diagram illustrative of an example of a functional configuration of the correction value calculation unit 36 of the first variation of the first embodiment.

The correction value calculation unit 36 includes a control steering angle calculation unit 46. The control steering angle calculation unit 46 calculates the control steering angle θr according to the steering angle θh. The differentiator 40 differentiates the control steering angle θr and thereby calculates steering angular velocity ω.

A steering angle gain setting unit 42 sets first gain G1 according to the control steering angle θr. As illustrated in FIG. 7A, a value of the first gain G1 is set to "0" when the control steering angle θr is "0", and the first gain G1 monotonically increases with respect to increase in an absolute value |θr| in a range where the absolute value |θr| of the control steering angle θr is greater than "0".

A second torque setting unit 44 sets second torque T2 according to the control steering angle θr. A value of the second torque T2 is set to "0" when the control steering angle θr is "0". In the range where the control steering angle θr is greater than "0", the second torque T2 monotonically increases with respect to increase in the control steering angle θr.

In a range where the control steering angle θr has a negative value, the second torque T2 has a characteristic that are origin symmetric to a characteristic of the second torque T2 in a range where the control steering angle θr has a positive value. That is, in a range where the control steering angle θr is less than "0", the second torque T2 monotonically decreases with respect to decrease in the control steering angle θr.

Setting the values of the first gain G1 and the second torque T2 to "0" when the control steering angle θr is "0" enables the value of the correction value Ic to be set to "0" in the range where the absolute value |θh| of the steering angle is less than or equal to the threshold value θt (that is, the range where the end-abutting impact suppression control is not performed).

Note that, in the range where the absolute value |θh| of the steering angle is less than or equal to the threshold value θt, the steering angular velocity ω is also "0" because the control steering angle θr is fixed to "0", and a value of first torque T1 is also "0".

Thus, even when the first gain G1 is omitted, the value of the correction value Ic=G1×T1+T2 can be set to "0".

Therefore, the steering angle gain setting unit 42 may be omitted. In this case, an adder 45 may calculate an addition result (T1+T2) of the first torque T1 and the second torque T2 as the correction value Ic.

Although an example in which the differentiator 40 differentiates the control steering angle θr and thereby calculates the steering angular velocity ω was described, the differentiator 40 may differentiate the steering angle θh and thereby calculate the steering angular velocity ω.

In addition, the second torque setting unit 44 may set second torque T2 that has a dead zone characteristic around a point at which the control steering angle θr is "0".

(Second Variation)

The second torque setting unit 44 of the first variation set the second torque T2 from the control steering angle θr, based on a relationship between the control steering angle θr and the second torque T2, which was set as map data or a calculation formula in advance.

A second torque setting unit 44 of a second variation sets the second torque T2, based on a multiplication result of a coefficient that increases according to increase in the control steering angle θr (for example, a spring coefficient) and the control steering angle θr.

Figure 8:
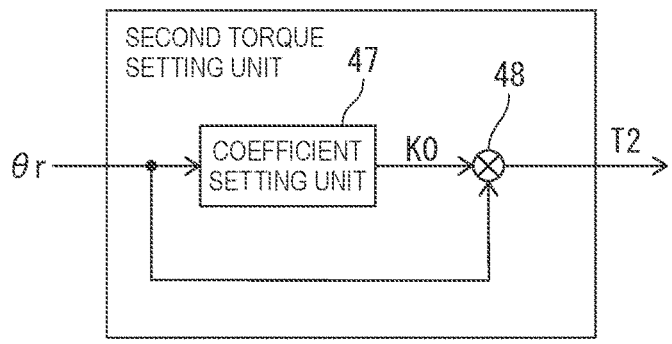
FIG. 8 is a block diagram illustrative of an example of a functional configuration of a second torque setting unit of a second variation of the first embodiment.

FIG. 8 is a block diagram illustrative of an example of a functional configuration of the second torque setting unit 44 of the second variation. The second torque setting unit 44 includes a coefficient setting unit 47 and a multiplier 48.

The coefficient setting unit 47 sets a coefficient K0 that increases according to increase in the control steering angle θr. The coefficient K0 may be, for example, a spring coefficient depending on the control steering angle θr.

The multiplier 48 calculates a multiplication result of the control steering angle θr and the coefficient K0 as the second torque T2.

(Third Variation)

Figure 9:
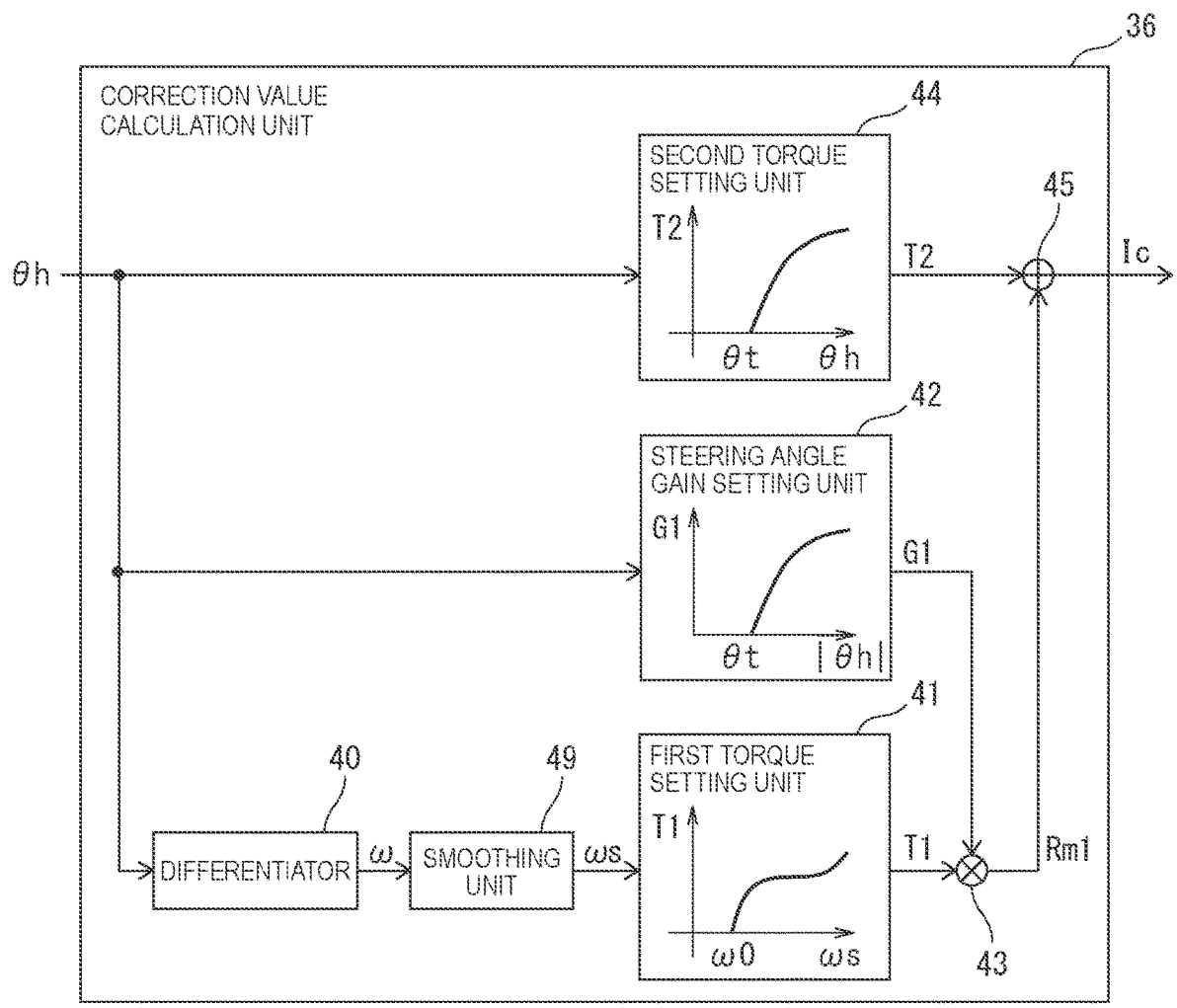
FIG. 9 is a block diagram illustrative of an example of a functional configuration of a correction value calculation unit of a third variation of the first embodiment.

FIG. 9 is a block diagram illustrative of an example of a functional configuration of a correction value calculation unit 36 of a third variation of the first embodiment.

The correction value calculation unit 36 of the third variation includes a smoothing unit 49 configured to smooth steering angular velocity ω calculated by a differentiator 40 and output smoothed steering angular velocity ωs. A first torque setting unit 41 sets first torque T1, based on the steering angular velocity ωs.

Smoothing the steering angular velocity ω enables noise included in the steering angular velocity ω to be removed.

For example, the smoothing unit 49 may be a low-pass filter (LPF), a phase delay filter, a band-pass filter (BPF), or a rate limiter.

For example, the smoothing unit 49 may also be a hysteresis processing unit configured to suppress harmonic components by causing the steering angular velocity ωs to have hysteresis characteristics.

Note that the third variation may be combined with the first and second variations.

Advantageous Effects of First Embodiment (1) The current command value calculation unit 31 calculates the first current command value Iref1, which causes the steering assist motor 20 to generate steering assist torque, based on at least the steering torque Th. The correction value calculation unit 36 calculates the correction value Ic for suppressing increase in the absolute value |θh| of the steering angle by correcting the steering assist torque when the absolute value |θh| of the steering angle is greater than or equal to the threshold value θt. The subtracter 37 calculates the second current command value Iref2, which is obtained by correcting the first current command value Iref1 by the correction value Ic.

The subtracter 32, the PI control unit 33, the PWM control unit 34, and the inverter 35 drive the steering assist motor 20, based on the second current command value Iref2. The correction value calculation unit 36 calculates the correction value Ic, based on the first torque T1, which nonlinearly changes with respect to the steering angular velocity ω.

Because of this configuration, it is possible to set the first torque T1, which suppresses increase in the absolute value |θh| of the steering angle, based on the steering angular velocity ω and thereby reduce the rate of change (dT1/dω) of the first torque T1 with respect to the steering angular velocity ω in an arbitrary velocity range of the steering angular velocity ω.

Reducing the rate of change (dT1/dω) causes the first torque T1 to be less likely to increase or decrease even when the steering angular velocity ω increases or decreases. Thus, the interaction between the first torque T1 and the steering angular velocity ω becomes small.

As a result, it is possible to reduce the vibration to be suppressed, which occurs due to repetition of increase and decrease in the steering angular velocity ω and the first torque T1, in an arbitrary velocity range. Thus, it is possible to reduce the vibration to be suppressed in a velocity range of the steering angular velocity ω where the vibration to be suppressed becomes large.

In the other velocity ranges, making the first torque T1 larger as the steering angular velocity ω becomes higher enables end-abutting to be prevented from occurring at high steering angular velocities ω.

In a velocity range of the steering angular velocity where there is no problem caused by impact at the time of end-abutting (for example, abnormal noise is low or there is no damage to the turning mechanism), setting the value of the first torque T1 to "0" enables influence on steering feeling to be suppressed.

Since the first torque T1 can be directly set according to the steering angular velocity ω, it becomes easier to directly understand the magnitude of steering reaction torque to be generated compared with, for example, a configuration to calculate damping force by multiplying the steering angular velocity ω by a viscosity coefficient.

(2) The correction value calculation unit may reduce the rate of change (dT1/dω) of the first torque T1 with respect to the steering angular velocity ω in a predetermined range of the steering angular velocity ω by nonlinearly changing the first torque T1 with respect to the steering angular velocity ω.

Because of this configuration, it is possible to reduce the vibration to be suppressed in a velocity range of the steering angular velocity ω where the vibration to be suppressed becomes large.

(3) The first torque setting unit 41 may set the first torque T1, based on the steering angular velocity ω in accordance with a preset nonlinear relationship between the steering angular velocity ω and the first torque T1.

Because of this configuration, it is possible to reduce the rate of change (dT1/dω) of the first torque T1 with respect to the steering angular velocity ω in an arbitrary velocity range of the steering angular velocity ω.

(4) The steering angle gain setting unit 42 may set the first gain G1 depending on the steering angle θh. The correction value calculation unit 36 may calculate the correction value Ic, based on the first multiplication result Rm1 of the first torque T1 and the first gain G1.

Because of this configuration, it is possible to set the value of the correction value Ic to "0" in a range where the end-abutting impact suppression control is not performed. It is also possible to increase or decrease the steering reaction force, which is applied according to the steering angular velocity ω in the end-abutting impact suppression control, according to the steering angle θh.

(5) The second torque setting unit 44 may set the second torque T2 depending on the steering angle θh. The correction value calculation unit 36 may calculate the correction value Ic, based on an addition result of the first torque T1 and the second torque T2 or an addition result of the first multiplication result Rm1 and the second torque T2.

Because of this configuration, it is possible to suppress increase in the absolute value |θh| of the steering angle by the second torque T2 depending on the steering angle θh, which is similar to spring reaction force.

Second Embodiment

Figure 10:
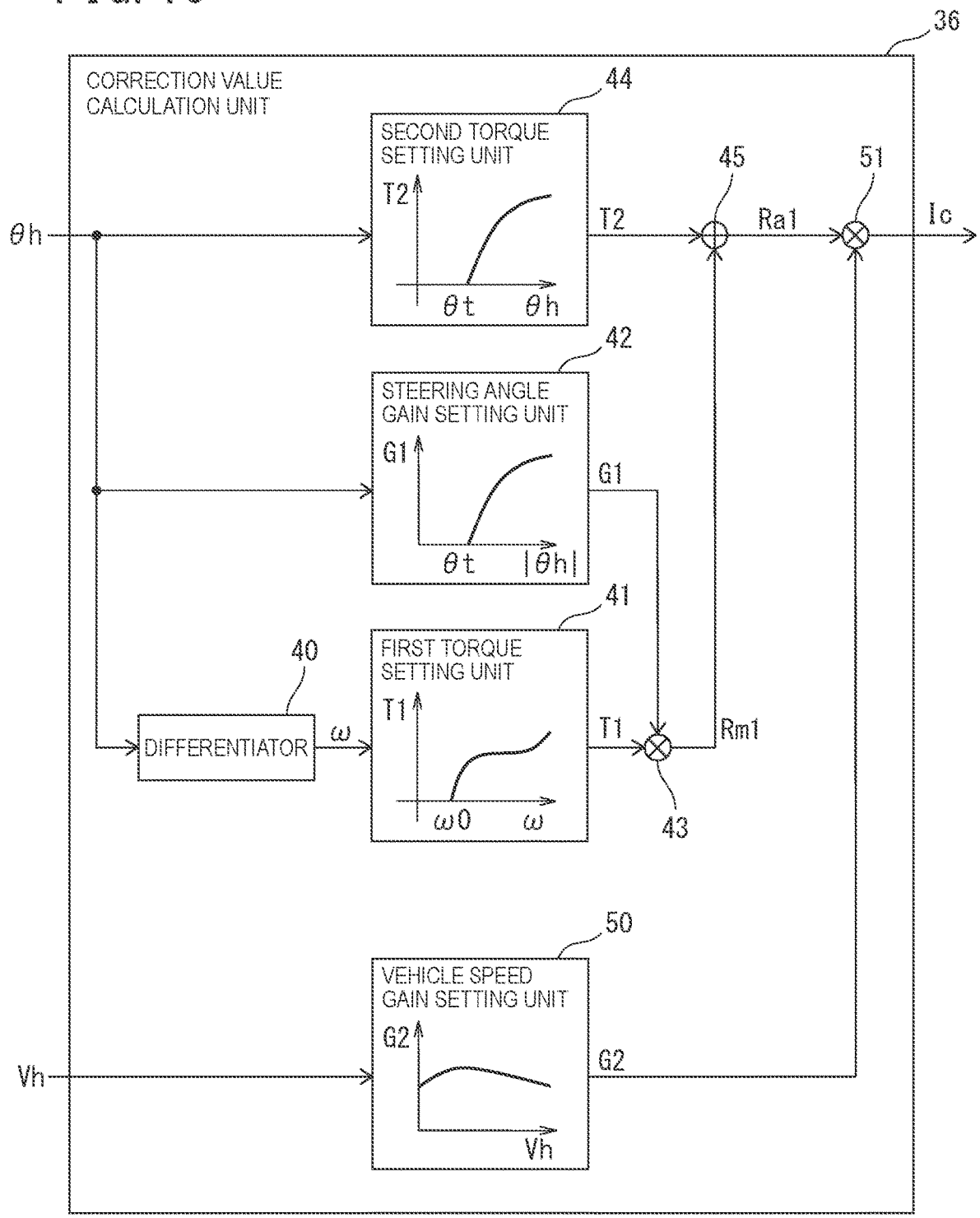
FIG. 10 is a block diagram illustrative of an example of a functional configuration of a correction value calculation unit of a second embodiment.

FIG. 10 is a block diagram illustrative of an example of a functional configuration of a correction value calculation unit 36 of a second embodiment.

Steering reaction force acting on a steering system fluctuates according to vehicle speed Vh. Thus, in a velocity range of the vehicle speed Vh where the steering reaction force is large, increase in an absolute value |θh| of a steering angle can be suppressed even when steering reaction torque that is applied in end-abutting impact suppression control is reduced.

Therefore, the correction value calculation unit 36 of the second embodiment increases or decreases a correction value Ic by use of gain depending on vehicle speed.

The correction value calculation unit 36 of the second embodiment includes a vehicle speed gain setting unit 50 and a multiplier 51.

The vehicle speed gain setting unit 50 sets second gain G2 depending on the vehicle speed. The steering reaction force is comparatively large at the time of vehicle stopping and in a high-speed range and comparatively small in a low-speed range and an intermediate-speed range. Therefore, at the time of vehicle stopping and in the high-speed range, the correction value Ic may be reduced compared with that in the low-speed range and the intermediate-speed range.

Thus, as illustrated in FIG. 10, the second gain G2 has a characteristic of being comparatively small at the time of vehicle stopping and in the high-speed range and being comparatively large in the low-speed range and the intermediate-speed range, and a characteristic line thereof may have an upward convex shape.

The multiplier 51 calculates a second multiplication result (G2×Ra1) of a first addition result Ra1=Rm1+T2 of a first multiplication result Rm1 and a second torque T2, which is output from an adder 45, and the second gain G2. The correction value calculation unit 36 calculates a current command value corresponding to a torque value represented by the second multiplication result, which is output from the multiplier 51, as the correction value Ic.

Advantageous Effect of Second Embodiment

The vehicle speed gain setting unit 50 may set the second gain G2 depending on the vehicle speed Vh. The correction value calculation unit 36 may calculate the correction value Ic, based on the multiplication result of the first addition result Ra1 and the second gain G2.

This configuration enables the correction value Ic to be adjusted according to the vehicle speed Vh. Because of this configuration, it is possible to reduce fluctuation according to the vehicle speed Vh in the steering reaction torque when, for example, the end-abutting impact suppression control is performed.

Third Embodiment

Actual steering reaction force acting on a steering system includes viscous reaction force depending on steering angular velocity ω and static reaction force depending on a steering angle θh, each of which changes according to vehicle speed Vh.

In end-abutting impact suppression control, increase in an absolute value |θh| of a steering angle is suppressed by first torque T1 depending on the steering angular velocity ω and second torque T2 depending on the steering angle θh.

Thus, in a velocity range of the vehicle speed Vh where the viscous reaction force becomes large, the first torque T1 may be reduced. In addition, in a velocity range the vehicle speed Vh where the static reaction force becomes large, the second torque T2 may be reduced.

Therefore, a correction value calculation unit 36 of a third embodiment adjusts a correction value Ic by setting two gains, which are independent of each other, according to the vehicle speed and respectively multiplying the first torque T1 depending on the steering angular velocity ω and the second torque T2 depending on the steering angle θh by the two gains.

Figure 11:
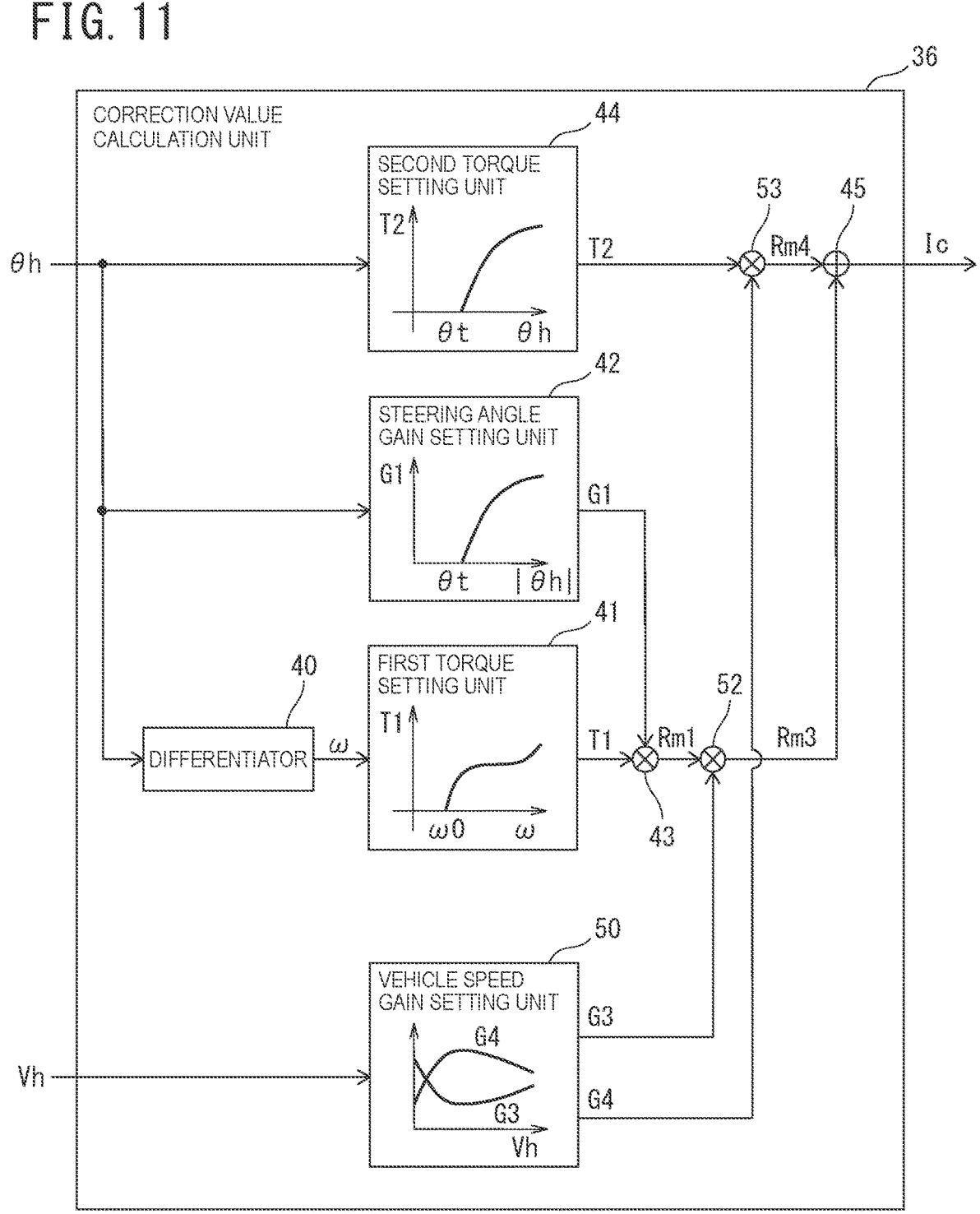
FIG. 11 is a block diagram illustrative of an example of a functional configuration of a correction value calculation unit of a third embodiment.

FIG. 11 is a block diagram illustrative of an example of a functional configuration of the correction value calculation unit 36 of the third embodiment. The correction value calculation unit 36 of the third embodiment includes a vehicle speed gain setting unit 50 and multipliers 52 and 53.

The vehicle speed gain setting unit 50 sets third gain G3 and fourth gain G4 both of which depend on the vehicle speed Vh. The multiplier 52 calculates a third multiplication result Rm3 of a first multiplication result Rm1 and the third gain G3, and the multiplier 53 calculates a fourth multiplication result Rm4 of the second torque T2 and the fourth gain G4.

An adder 45 calculates an addition result (Rm3+Rm4) of the third multiplication result Rm3 and the fourth multiplication result Rm4. The correction value calculation unit 36 calculates, as the correction value Ic, a current command value corresponding to a torque value that is an addition result output from the adder 45.

In this manner, the third gain G3 is multiplied with the first torque T1 and thereby adjusts steering reaction torque that is applied according to the steering angular velocity ω in the end-abutting impact suppression control.

As described above, the steering reaction force acting on the steering system includes viscous reaction force depending on the steering angular velocity ω, and the viscous reaction force changes according to the vehicle speed Vh.

Figure 12A:
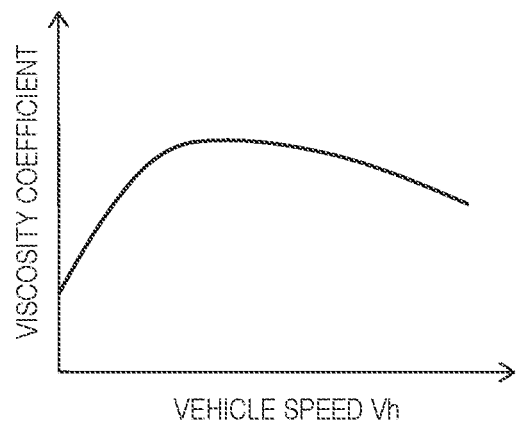
FIGS. 12A, 12B, 12C, and 12D are an explanatory diagram of a relationship between a viscosity coefficient of viscous reaction force in a steering system and vehicle speed, an explanatory diagram of an example of a characteristic of third gain, an explanatory diagram of a relationship between static reaction force and vehicle speed, and an explanatory diagram of an example of a characteristic of fourth gain, respectively.

FIG. 12A illustrates an example of a relationship between a viscosity coefficient of the viscous reaction force of the steering system and the vehicle speed Vh. The viscosity coefficient has a characteristic of being small at the time of vehicle stopping and gradually decreasing when the vehicle speed Vh becomes higher than a low-speed range, and a characteristic line thereof has an upward convex shape.

Figure 12B:
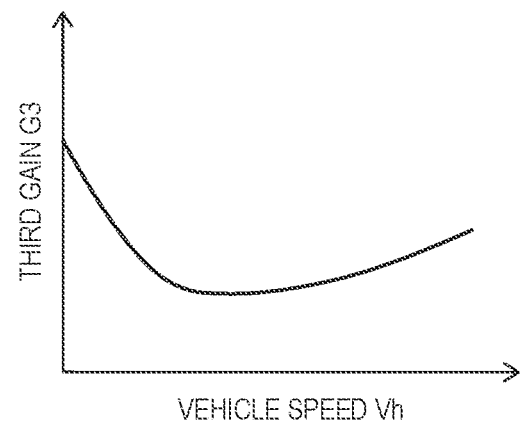

Therefore, the third gain G3 preferably adjusts the steering reaction torque that is applied according to the steering angular velocity ω in the end-abutting impact suppression control in such a way that the steering reaction torque becomes comparatively large in a velocity range higher than the low-speed range and at the time of vehicle stopping and becomes comparatively small in the low-speed range. Thus, as illustrated in FIG. 12B, the third gain G3 has a characteristic of becoming large in a velocity range higher than the low-speed range and at the time of vehicle stopping and becoming small in the low-speed range, and a characteristic line thereof may have a downward convex shape.

The fourth gain G4 is multiplied with the second torque T2 and thereby adjusts the steering reaction force that is applied according to the steering angle θh in the end-abutting impact suppression control.

As described above, the steering reaction force acting on the steering system includes static reaction force depending on the steering angle θh, and the static reaction force changes according to the vehicle speed Vh.

Figure 12C:
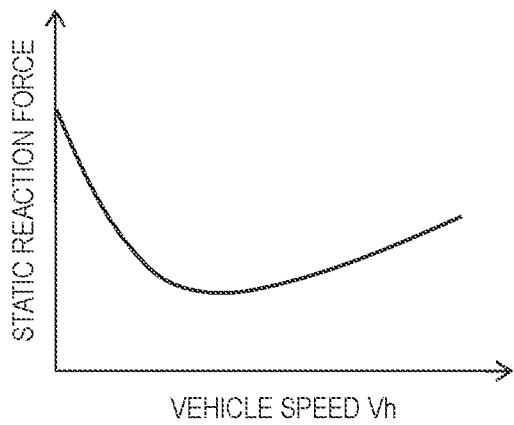

FIG. 12C illustrates an example of a relationship between the static reaction force and the vehicle speed Vh. Static reaction force from tires is large at the time of vehicle stopping and, when the vehicle starts moving, temporarily decreases because the tires rotate. Subsequently, the static reaction force becomes large under the influence of centrifugal force in a high-speed range. Therefore, a characteristic line of the static reaction force has a downward convex shape.

Figure 12D:
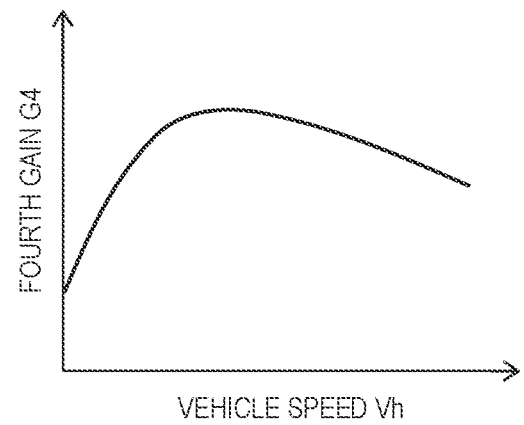

Therefore, the fourth gain G4 preferably adjusts the steering reaction torque that is applied according to the steering angle θh in the end-abutting impact suppression control in such a way that the steering reaction torque is small at the time of vehicle stopping, temporarily increases in association with increase in the vehicle speed Vh, and becomes comparatively small in the high-speed range. Thus, as illustrated in FIG. 12D, the fourth gain G4 has a characteristic of being small at the time of vehicle stopping, temporarily increasing in association with increase in the vehicle speed Vh, and becoming comparatively small in the high-speed range, and a characteristic line thereof may have an upward convex shape.

Advantageous Effect of Third Embodiment

The vehicle speed gain setting unit 50 may set the third gain G3 and the fourth gain G4 both of which depend on the vehicle speed Vh.

The correction value calculation unit 36 may calculate the correction value Ic, based on an addition result obtained by adding the third multiplication result Rm3 of the first multiplication result Rm1 and the third gain G3 (or the third multiplication result Rm3 of the first torque T1 and the third gain G3) to the fourth multiplication result Rm4 of the second torque T2 and the fourth gain G4.

Because of this configuration, it is possible to adjust the steering reaction torque, the steering reaction torque being applied according to the steering angular velocity ω in the end-abutting impact suppression control, according to the steering reaction force, the steering reaction force acting on the steering system according to the steering angular velocity ω, changing depending on the vehicle speed Vh. It is also possible to adjust the steering reaction torque, the steering reaction torque being applied according to the steering angle θh in the end-abutting impact suppression control, according to the steering reaction force, the steering reaction force acting on the steering system according to the steering angle θh, changing depending on the vehicle speed Vh. For example, because of this capability, it is possible to reduce fluctuation according to the vehicle speed Vh in the steering reaction torque when the end-abutting impact suppression control is performed.

Fourth Embodiment

The correction value calculation unit 36 of the third embodiment multiplied the first torque T1 and the second torque T2 by the third gain G3 and the fourth gain G4, both of which depend on the vehicle speed, respectively. In place of this configuration, a correction value calculation unit 36 of a fourth embodiment sets first gain G1 by which first torque T1 is multiplied and second torque T2 according to vehicle speed Vh. This configuration enables advantageous effects similar to those of the third embodiment to be attained.

Figure 13:
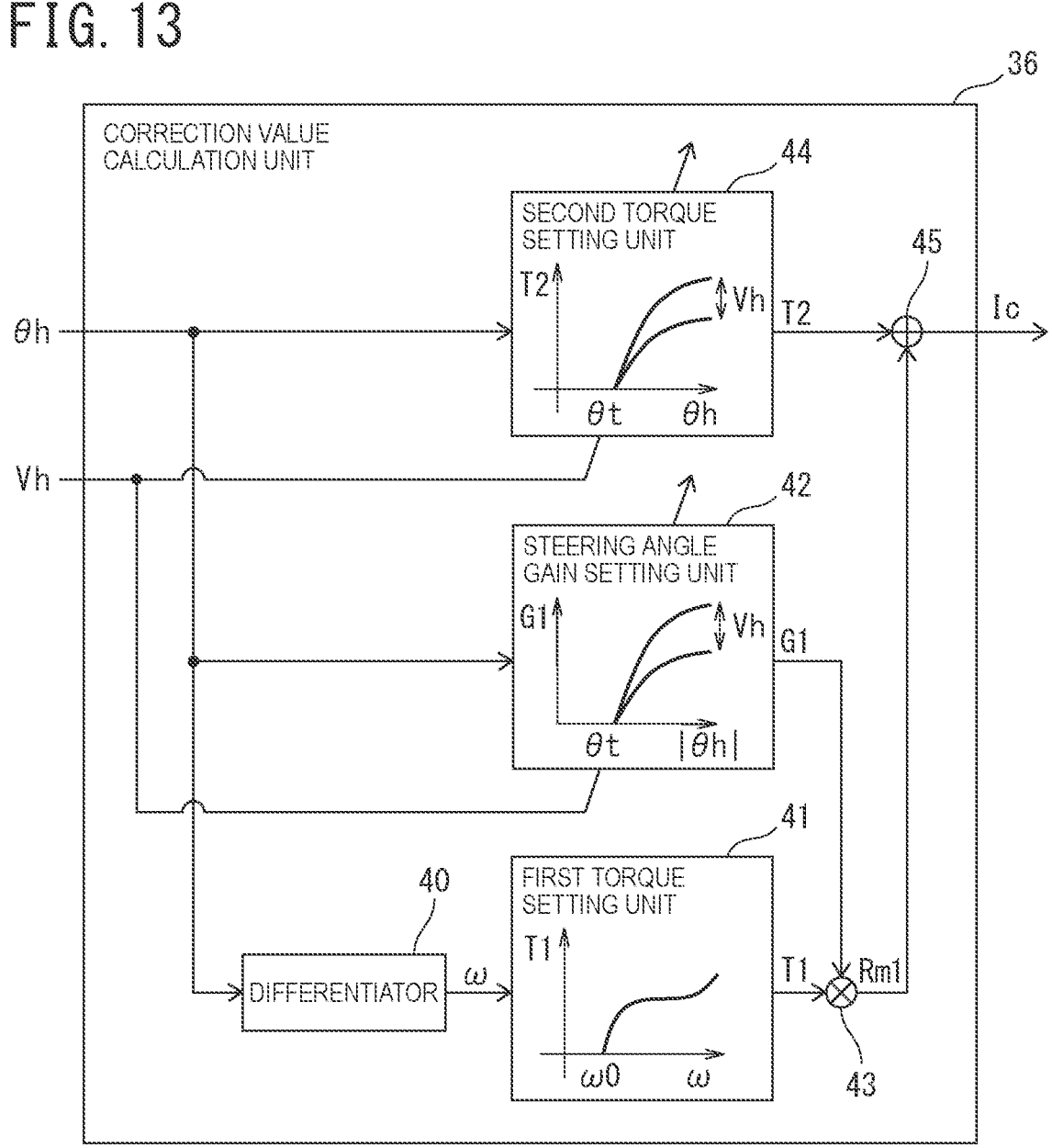
FIG. 13 is a block diagram illustrative of an example of a functional configuration of a correction value calculation unit of a fourth embodiment.

FIG. 13 is a block diagram illustrative of an example of a functional configuration of the correction value calculation unit of the fourth embodiment.

A steering angle gain setting unit 42 sets first gain G1 that changes according to the vehicle speed Vh. For example, a first gain G1 corresponding to a desired vehicle speed Vh may be set by setting first gains G1 having a plurality of characteristics that respectively correspond to a plurality of vehicle speeds Vh in the steering angle gain setting unit 42 and interpolating values between the plurality of characteristics. A first torque setting unit 41 may set the first torque T1 that changes according to the vehicle speed Vh.

A second torque setting unit 44 sets the second torque T2 that changes according to the vehicle speed Vh. For example, a second torque T2 corresponding to a desired vehicle speed Vh may be set by setting second torques T2 having a plurality of characteristics that respectively correspond to a plurality of vehicle speeds Vh in the second torque setting unit 44 and interpolating values between the plurality of characteristics.

Advantageous Effect of Fourth Embodiment

The correction value calculation unit 36 may change at least one of the characteristic of the first gain G1 and the characteristic of the second torque T2 according to the vehicle speed. The correction value calculation unit 36 may also change at least one of a characteristic of the first torque T1 and the characteristic of the second torque T2 according to the vehicle speed.

Because of this configuration, it is possible to adjust the steering reaction torque, the steering reaction torque being applied according to the steering angular velocity ω in the end-abutting impact suppression control, according to the steering reaction force, the steering reaction force acting on the steering system according to the steering angular velocity ω, changing depending on the vehicle speed Vh. It is also possible to adjust the steering reaction torque, the steering reaction torque being applied according to the steering angle θh in the end-abutting impact suppression control, according to the steering reaction force, the steering reaction force acting on the steering system according to the steering angle θh, changing depending on the vehicle speed Vh. For example, because of this capability, it is possible to reduce fluctuation according to the vehicle speed Vh in the steering reaction torque when the end-abutting impact suppression control is performed.

Fifth Embodiment

The steering angle gain setting unit 42 of the embodiments having been described thus far sets the value of the first gain G1 to "0" in a range where the absolute value |θh| of the steering angle is less than or equal to the threshold value θt and sets the first gain G1 in such a way that the first gain G1 monotonically increases with respect to increase in the absolute value |θh| in a range where the absolute value |θh| is greater than the threshold value θt. The second torque setting unit 44 sets the value of the second torque T2 to "0" in a range where the absolute value |θh| of the steering angle θh is less than or equal to the threshold value θt and sets the second torque T2 in such a way that the second torque T2 monotonically increases with respect to increase in the absolute value |θh| in a range where the absolute value |θh| of the steering angle θh is greater than the threshold value θt.

The second torque setting unit 44 may also set the threshold value θt2 that is larger than the threshold value θt and set the value of the second torque T2 to "0" in a range where the steering angle θh is greater than or equal to the threshold value (−θt2) and less than or equal to the threshold value θt2, set the second torque T2 in such a way that the second torque T2 monotonically increases with respect to increase in the steering angle θh in a range where the steering angle θh is greater than the threshold value θt2, and set the second torque T2 in such a way that the second torque T2 monotonically decreases with respect to decrease in the steering angle θh in a range where the steering angle θh is less than the threshold value (−θt2).

Figure 14:
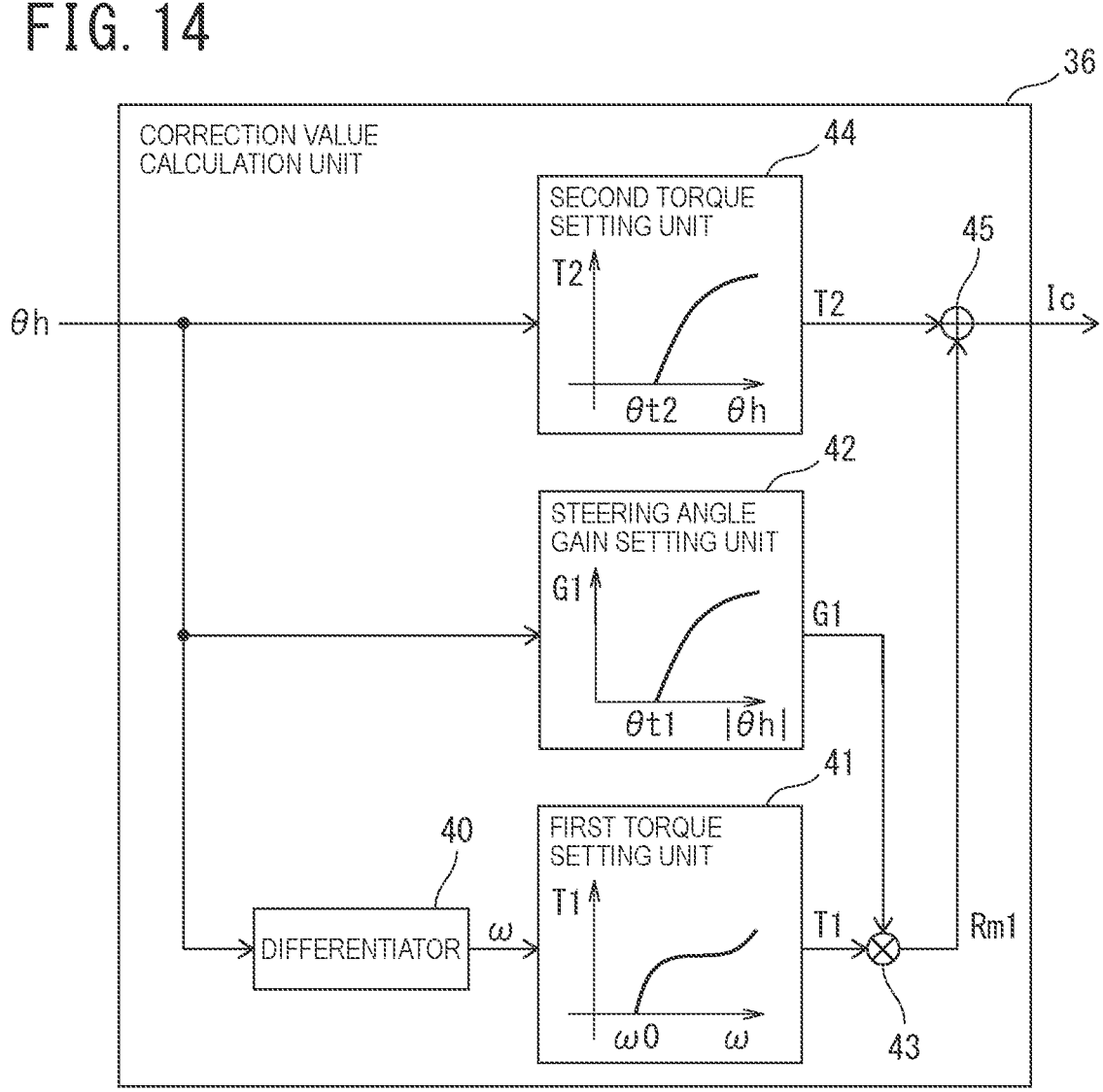
FIG. 14 is a block diagram illustrative of an example of a functional configuration of a correction value calculation unit of a fifth embodiment.

A steering angle gain setting unit 42 and a second torque setting unit 44 of a fifth embodiment set first gain G1 and second torque T2 by use of different threshold values with respect to an absolute value |θh| of a steering angle. FIG. 14 is a block diagram illustrative of an example of a functional configuration of a correction value calculation unit 36 of the fifth embodiment.

The second torque setting unit 44 sets a threshold value θt2 that is greater than a threshold value θt and sets a value of the second torque T2 to "0" in a range where the steering angle θh is greater than or equal to a threshold value (−θt2) and less than or equal to the threshold value θt2. The second torque setting unit 44 may set the second torque T2 in such a way that the second torque T2 monotonically increases with respect to increase in the steering angle θh in a range where the steering angle θh is greater than the threshold value θt2 and set the second torque T2 in such a way that the second torque T2 monotonically decreases with respect to decrease in the steering angle θh in a range where the steering angle θh is less than the threshold value (−θt2).

The steering angle gain setting unit 42 sets a threshold value θt1 that is greater than the threshold value θt and sets a value of the first gain G1 to "0" in a range where the absolute value |θh| of the steering angle is less than or equal to the threshold value θt1 and sets the first gain G1 in such a way that the first gain G1 monotonically increases with respect to increase in the absolute value |θh| in a range where the absolute value |θh| is greater than the threshold value θt1.

The threshold value θt1 and the threshold value θt2 may be different from each other, and one of the threshold value θt1 and the threshold value θt2 may be equal to the threshold value θt.

Setting the threshold value θt1 and the threshold value θt2 in such a way as to be different from each other enables one of reaction forces to be output preferentially to the other with respect to the steering angle. For example, setting the threshold value θt1 to a steering angle smaller than the threshold value θt2 enables a multiplication result of first torque T1 and the first gain G1 to be output precedently to the second torque T2 when the steering angle increases in the direction toward a rack end. Since reaction force comes to be generated only when steering velocity is comparatively large, it is possible to achieve an end-abutting suppression effect while suppressing deterioration of steering feeling. In addition, for example, setting the threshold value θt2 to a steering angle smaller than the threshold value θt1 enables static reaction force to be generated precedently. A driver is able to feel that the steering angle has reached a rack end even when the steering velocity is low.

Sixth Embodiment

The correction value calculation unit 36 of the first embodiment includes the steering angle gain setting unit 42 configured to set the first gain G1 depending on the steering angle θh. The multiplier 43 multiplies the first torque T1 by the first gain G1 from the steering angle gain setting unit 42 and outputs the first multiplication result Rm1. In place of the steering angle gain setting unit 42 of the first embodiment, a correction value calculation unit 36 of a sixth embodiment includes a steering angle gain setting unit 42 to which a steering angle θh and steering angular velocity ω are input and that is configured to set first gain G1 by which first torque T1 is multiplied.

Figure 15:
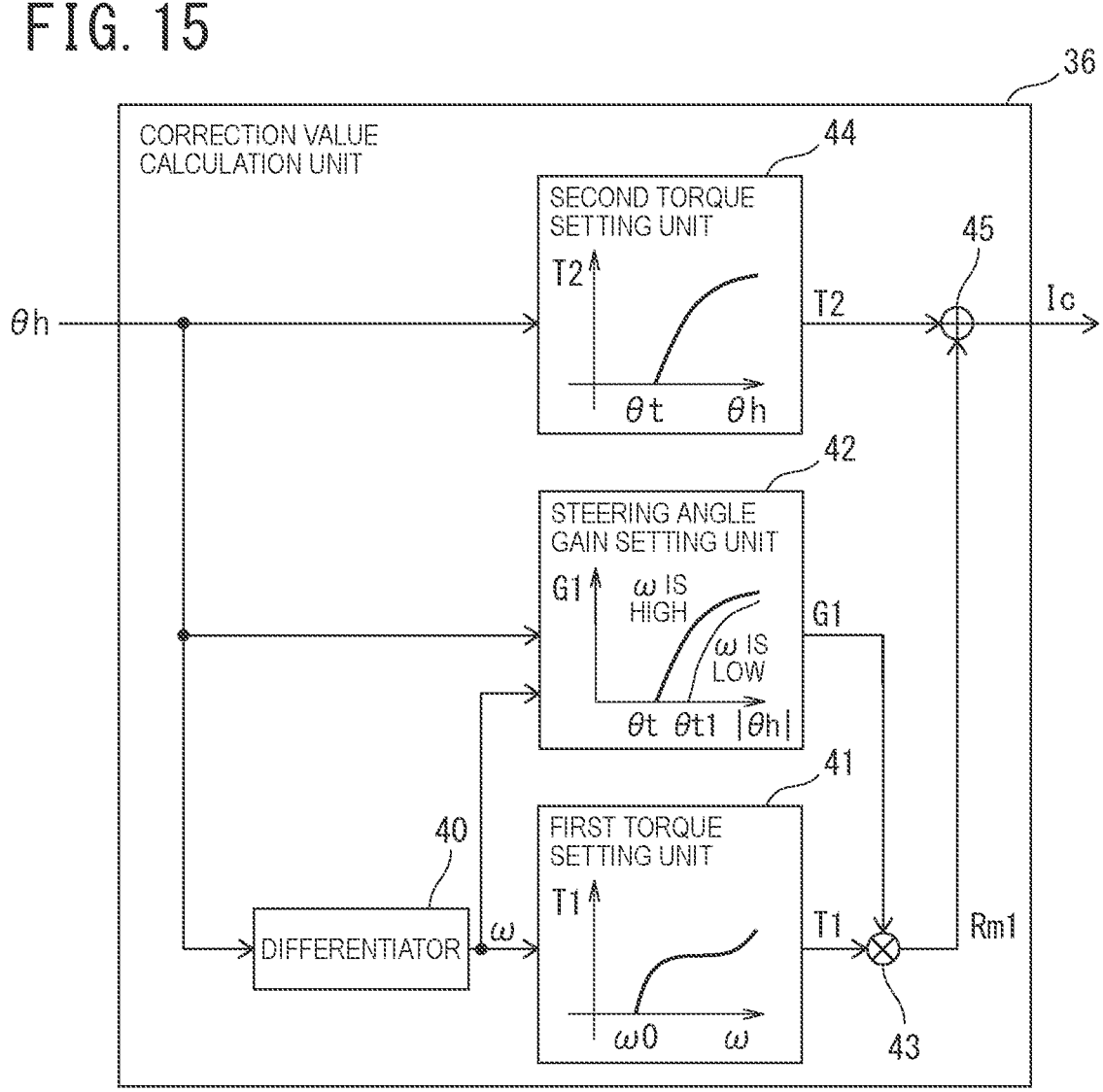
FIG. 15 is a block diagram illustrative of an example of a functional configuration of a correction value calculation unit of a sixth embodiment.

FIG. 15 is a block diagram illustrative of an example of a functional configuration of the correction value calculation unit of the sixth embodiment.

The steering angle gain setting unit 42 sets the first gain G1 that changes according to the steering angular velocity ω. The steering angle gain setting unit 42, for example, sets first gains G1 depending on the steering angle that have a plurality of characteristics that respectively correspond to a plurality of steering angular velocities ω. The steering angle gain setting unit 42 may set a first gain G1 corresponding to a desired steering angular velocity ω by interpolating values between the plurality of characteristics according to the steering angular velocity ω. Alternatively, the steering angle gain setting unit 42 sets first gains G1 depending on the steering angle that have a plurality of characteristics that respectively correspond to a plurality of steering angular velocity ranges. The steering angle gain setting unit 42 may determine in which steering angular velocity range the steering angular velocity ω is included and select a characteristic from among the plurality of characteristics.

The higher the steering angular velocity ω is, the larger the steering angle gain setting unit 42 may set the first gain G1. Alternatively, the lower the steering angular velocity ω is, the closer to a rack end the steering angle gain setting unit 42 may set a steering angle at which the first gain G1 becomes nonzero. In other words, the higher the steering angular velocity ω is, the further from the rack end the steering angle gain setting unit 42 may set the steering angle at which the first gain G1 becomes nonzero. The steering angle gain setting unit 42 changes a steering angle range where the first gain G1 is "0" (a dead zone) according to the steering angular velocity ω.

For example, as illustrated in FIG. 15, when the steering angular velocity ω is low, the steering angle gain setting unit 42 may set a value of the first gain G1 to "0" in a range where an absolute value |θh| of the steering angle is less than or equal to a threshold value θt1 that is greater than a threshold value θt and set the first gain G1 in such a way that the first gain G1 monotonically increases with respect to increase in the absolute value |θh| in a range where the absolute value |θh| is greater than the threshold value θt1. When the steering angular velocity ω is high, the steering angle gain setting unit 42 may set the value of the first gain G1 to "0" in a range where the absolute value |θh| of the steering angle is less than or equal to the threshold value θt and set the first gain G1 in such a way that the first gain G1 monotonically increases with respect to increase in the absolute value |θh| in a range where the absolute value |θh| is greater than the threshold value θt.

Advantageous Effect of Sixth Embodiment

The steering angle gain setting unit 42 sets the first gain G1 by which the the first torque T1 is multiplied according to the steering angle θh and the steering angular velocity ω.

Because of this configuration, it is possible to more finely adjust steering reaction torque that is applied according to the steering angular velocity ω in end-abutting impact suppression control. It is possible to adjust the steering reaction torque in such a way that the higher the steering angular velocity ω is, the larger the steering reaction torque becomes, as a result of which it is possible to effectively decelerate steering velocity. By adjusting the steering angle at which the first gain G1 becomes nonzero, based on the steering angular velocity ω, it is possible to, as the steering angular velocity ω becomes higher, decelerate the steering velocity at a steering angle further from a rack end.

(Variation)

The steering angle gain setting unit 42 of the sixth embodiment may be applied to any one of the second to fifth embodiments. Since it is possible to change the first gain G1 by which the first torque T1 is multiplied according to the steering angular velocity ω, it is possible to more finely adjust the steering reaction torque.

REFERENCE SIGNS LIST

1 Steering wheel
2 Steering shaft
3 Reduction gear
4a, 4b Universal joint
5 Pinion rack mechanism
5a Pinion
5b Rack
6a, 6b Tie rod
7a, 7b Hub unit
8L, 8R Steered wheel
10 Torque sensor
11 Key
12 Vehicle speed sensor
13 Battery
14 Steering angle sensor
20 Steering assist motor
21 Motor current detector
30 Controller
31 Current command value calculation unit
32, 37 Subtracter
33 PI control unit
34 PWM control unit
35 Inverter
36 Correction value calculation unit
40 Differentiator
41 First torque setting unit
42 Steering angle gain setting unit
43, 48, 51, 52, 53 Multiplier
44 Second torque setting unit
45 Adder
46 Control steering angle calculation unit
47 Coefficient setting unit
49 Smoothing unit
50 Vehicle speed gain setting unit

The invention claimed is:

1. A control device comprising:
   a memory that stores a set of instructions; and
   at least one processor configured to execute the set of instructions to:
   calculate a first current command value, the first current command value causing an actuator to generate steering assist torque, based on at least steering torque;
   when an absolute value of steering angle is greater than or equal to a threshold value, calculate a correction value for suppressing increase in an absolute value of the steering angle by correcting the steering assist torque;
   calculate a second current command value obtained by correcting the first current command value by the correction value; and
   drive the actuator, based on the second current command value,
   wherein the correction value is calculated, based on first torque, the first torque changing nonlinearly with respect to steering angular velocity,
   wherein the first torque is zero in a range where steering angular velocity is lower than a first steering angular velocity and changes from zero to a nonzero value at the first steering angular velocity,
   wherein a rate of change of the first torque with respect to the steering angular velocity in a range between a second steering angular velocity, the second steering angular velocity being higher than the first steering angular velocity, and the first steering angular velocity is larger than a rate of change of the first torque with respect to the steering angular velocity in a range between a third steering angular velocity, the third steering angular velocity being higher than the second steering angular velocity, and the second steering angular velocity, and
   wherein a rate of change of the first torque with respect to the steering angular velocity in a range greater than or equal to the third steering angular velocity is larger than a rate of change of the first torque with respect to the steering angular velocity in a range between the third steering angular velocity and the second steering angular velocity.

2. The control device according to claim 1, wherein the at least one processor configured to execute the set of instructions to reduce a rate of change of the first torque with respect to the steering angular velocity in a predetermined range of the steering angular velocity by nonlinearly changing the first torque with respect to the steering angular velocity.

3. The control device according to claim 1, wherein the at least one processor is configured to execute the set of instructions to set the first torque according to the steering angular velocity in accordance with a preset nonlinear relationship between the steering angular velocity and the first torque.

4. The control device according to claim 1, wherein the at least one processor configured to execute the set of instructions to set first gain depending on the steering angle and calculate the correction value, based on a first multiplication result of the first torque and the first gain.

5. The control device according to claim 1, wherein the at least one processor configured to execute the set of instructions to set second torque depending on the steering angle and calculate the correction value, based on a first addition result of the first torque and the second torque.

6. The control device according to claim 4, wherein the at least one processor configured to execute the set of instructions to set second torque depending on the steering angle and calculate the correction value, based on a first addition result of the first multiplication result and the second torque.

7. The control device according to claim 4, wherein the at least one processor configured to execute the set of instructions to change a characteristic of the first gain according to the steering angular velocity.

8. The control device according to claim 5, wherein the at least one processor configured to execute the set of instructions to set second gain depending on vehicle speed and calculates the correction value, based on a second multiplication result of the first addition result and the second gain.

9. The control device according to claim 5, wherein the at least one processor configured to execute the set of instructions to set third gain and fourth gain, the third gain and fourth gain depending on vehicle speed, and calculate the correction value, based on a second addition result obtained by adding a third multiplication result of the first torque and the third gain to a fourth multiplication result of the second torque and the fourth gain.

10. The control device according to claim 6, wherein the at least one processor configured to execute the set of instructions to set third gain and fourth gain, the third gain and fourth gain depending on vehicle speed, and calculate the correction value, based on a second addition result obtained by adding a third multiplication result of the first multiplication result and the third gain to a fourth multiplication result of the second torque and the fourth gain.

11. The control device according to claim 6, wherein the at least one processor configured to execute the set of instructions to change at least one of a characteristic of the first gain and a characteristic of the second torque according to vehicle speed.

12. The control device according to claim 6, wherein the at least one processor configured to execute the set of instructions to change at least one of a characteristic of the first torque and a characteristic of the second torque according to vehicle speed.

13. The control device according to claim 7, wherein the at least one processor configured to execute the set of instructions to change a characteristic of the first gain according to vehicle speed.

14. The control device according to claim 6, wherein the at least one processor configured to execute the set of instructions to set the first gain to 0 when an absolute value of the steering angle is less than or equal to a first threshold value and set the second torque to 0 when an absolute value of the steering angle is less than or equal to a second threshold value, the second threshold value being different from the first threshold value.

15. An electric power steering device comprising:
the control device according to claim 1; and
an actuator controlled by the control device,
wherein the electric power steering device applies steering assist torque to a steering system of a vehicle through the actuator.

* * * * *